(12) United States Patent
Nakashin

(10) Patent No.: US 9,215,431 B2
(45) Date of Patent: Dec. 15, 2015

(54) IMAGE PROCESSING APPARATUS, PROJECTOR AND CONTROL METHOD OF PROJECTOR

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 236 days.

(21) Appl. No.: 13/783,918

(22) Filed: Mar. 4, 2013

(65) Prior Publication Data

US 2013/0235092 A1 Sep. 12, 2013

(30) Foreign Application Priority Data

Mar. 8, 2012 (JP) ................. 2012-051212

(51) Int. Cl.
   G03B 21/14    (2006.01)
   H04N 9/31     (2006.01)
   G09G 5/10     (2006.01)
   G09G 3/00     (2006.01)

(52) U.S. Cl.
   CPC ............. H04N 9/3185 (2013.01); G03B 21/14 (2013.01); G09G 3/002 (2013.01); G09G 5/10 (2013.01); H04N 9/317 (2013.01); G09G 2320/0693 (2013.01); G09G 2320/106 (2013.01); G09G 2360/145 (2013.01); H04N 9/3197 (2013.01)

(58) Field of Classification Search
   CPC . H04N 5/2351; H04N 5/2353; H04N 5/2354; H04N 5/23219

USPC ......... 353/30, 38, 69–70, 98, 101; 348/223.1, 348/229.1, 333.12, 373, 743–747, 383, 348/E9.012; 349/5, 7–9
See application file for complete search history.

(56) References Cited

U.S. PATENT DOCUMENTS

| 7,524,070 B2* | 4/2009 | Matsuda et al. ............... 353/70 |
| 2005/0206859 A1 | 9/2005 | Miyasaka |
| 2005/0231820 A1 | 10/2005 | Miyasaka |
| 2008/0259223 A1* | 10/2008 | Read et al. .................... 348/745 |
| 2009/0073323 A1* | 3/2009 | Inoue ............................ 348/744 |
| 2010/0026972 A1 | 2/2010 | Kaneko |
| 2010/0128231 A1* | 5/2010 | Furui ............................. 353/70 |
| 2010/0315602 A1* | 12/2010 | Takahashi ....................... 353/70 |
| 2012/0236270 A1* | 9/2012 | Maruyama .................... 353/101 |

FOREIGN PATENT DOCUMENTS

| JP | 2004-205681 A | 7/2004 |
| JP | A-2005-159426 | 6/2005 |
| JP | 2005-269361 A | 9/2005 |

(Continued)

Primary Examiner — Sultan Chowdhury
(74) Attorney, Agent, or Firm — Oliff PLC

(57) ABSTRACT

An image processing apparatus projects and displays an image on a projection surface. The image processing apparatus includes an adjustment image producing section (an adjustment image producing section and an image analysis section) that produces an adjustment image for adjusting a focus of a projected image to be displayed on the projection surface and an imaging section that images the adjustment image projected on the projection surface. The adjustment image producing section changes the adjustment image to be produced, such that a grayscale pattern of a captured adjustment image obtained by imaging is close to a grayscale pattern of the adjustment image.

14 Claims, 15 Drawing Sheets

(56) References Cited

FOREIGN PATENT DOCUMENTS

| JP | 2005-269363 A | 9/2005 |
| JP | A-2010-032842 | 2/2010 |
| JP | A-2011-065186 | 3/2011 |
| JP | A-2011-176629 | 9/2011 |

* cited by examiner

[OBLIQUE PROJECTION]

(RECTANGULAR WIDTH: MEDIUM,
RECTANGULAR INTERVAL: MEDIUM)

CORRECTION METHOD
- MAKE RECTANGULAR WIDTH THICK
or
- MAKE RECTANGULAR INTERVAL BROAD (a) [RECTANGULAR WIDTH: MEDIUM, RECTANGULAR INTERVAL: MEDIUM]

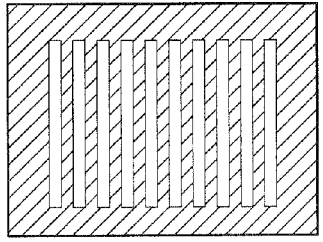

(b1) [RECTANGULAR WIDTH: THIN, RECTANGULAR INTERVAL: MEDIUM]

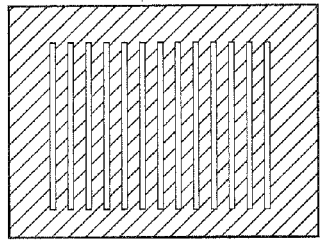

(b2) [RECTANGULAR WIDTH: THICK, RECTANGULAR INTERVAL: MEDIUM]

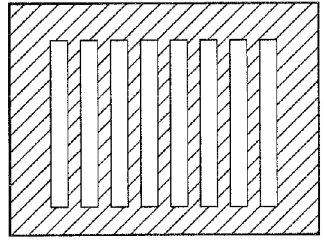

(c1) [RECTANGULAR WIDTH: MEDIUM, RECTANGULAR INTERVAL: NARROW]

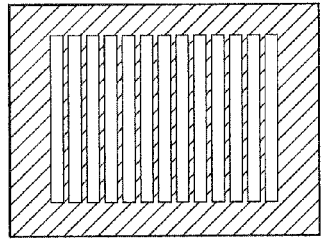

(c2) [RECTANGULAR WIDTH: MEDIUM, RECTANGULAR INTERVAL: BROAD]

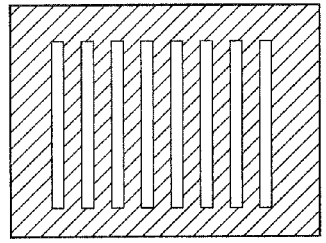

(d1) [RECTANGULAR WIDTH: THIN, RECTANGULAR INTERVAL: NARROW]

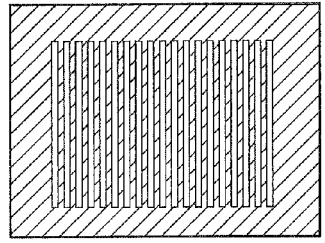

(d2) [RECTANGULAR WIDTH: THIN, RECTANGULAR INTERVAL: BROAD]

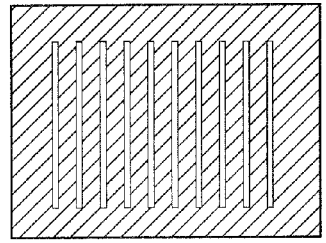

(e1) [RECTANGULAR WIDTH: THICK, RECTANGULAR INTERVAL: NARROW]

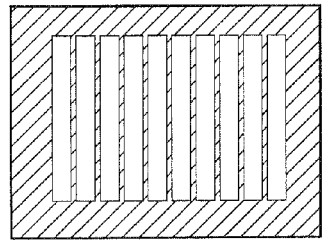

(e2) [RECTANGULAR WIDTH: THICK, RECTANGULAR INTERVAL: BROAD]

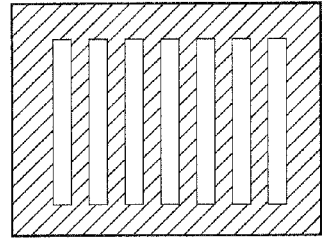

FIG. 11A (f) [RECTANGULAR WIDTH: THICK TO THIN, RECTANGULAR INTERVAL: MEDIUM]

(g) [RECTANGULAR WIDTH: THIN TO THICK, RECTANGULAR INTERVAL: MEDIUM]

(A)

(B)

(C)

(D)

IMAGE PROCESSING APPARATUS, PROJECTOR AND CONTROL METHOD OF PROJECTOR

The entire disclosure of Japanese Patent Application No. 2012-051212, filed Mar. 8, 2012 is expressly incorporated by reference herein.

BACKGROUND

1. Technical Field

The present invention relates to a projector that projects and displays an image on a projection surface.

2. Related Art

When an image is projected and displayed on a projection surface such as a screen, using a projector, a focus adjustment for adjusting a deviation of a focus (focus point) of an image projected on the projection surface (hereinafter, referred to as a "projected image") and an adjustment such as a keystone correction for correcting a distortion in an image range of projected image (hereinafter, referred to as a "keystone distortion") are generally performed due to a relative positional relation between the projector and the projection surface.

As disclosed in JP-A-2010-32842, for example, the focus adjustment is performed in such a way that a pattern image having a stripe shape in which a white line and a black line are alternately arranged is projected and a focal position of a focus lens is changed in order to increase a difference between a grayscale value of the white line and a grayscale value of the black line of the projected image which is captured (hereinafter, referred to as a "captured projected image").

When the focus adjustment described above is performed, there is a case where the focus adjustment may be insufficient due to a projection state of a projector at a focus adjustment starting point, such as a relative positional relation between a projector and a projection surface, a deviation degree of a focus before the adjustment, a focal position of a focus lens before the adjustment, and a performance of an imaging camera. For example, when the resolution of the imaging camera is low or when the deviation degree of the focus is high, there are cases where a portion of a white line of a captured projected image is blackened, a portion of a black line of the captured projected image is whitened, the captured projected image is entirely whitened or the captured projected image is entirely blackened. In these cases, a difference between a grayscale value of a portion of the white line and a grayscale value of a portion of the black line of the captured projected image before the adjustment is originally small. Accordingly, even if the focal position of the focus lens is changed, the variation amount is also small, whereby causing a problem such as a difficulty in performing an accurate adjustment. Therefore, the focus adjustment is likely to be insufficient. In addition, a desirable focal position may become out of an adjustment range.

SUMMARY

An advantage of some aspects of the invention is to provide a technique that suppresses an influence due to a projection state of a projector at a starting point of a focus adjustment, and that thereby improves an accuracy of the focus adjustment.

The invention can be implemented as the following forms or application examples.

APPLICATION EXAMPLE 1

This application example of the invention is directed to an image processing apparatus used in a projector which projects and displays an image on a projection surface, the image processing apparatus including an adjustment image producing section that produces an adjustment image for adjusting a focus of a projected image displayed on the projection surface; and an imaging section that images the adjustment image projected on the projection surface, wherein the adjustment image producing section changes the adjustment image to be produced, such that a grayscale pattern of a captured adjustment image obtained by imaging is close to a grayscale pattern of the adjustment image.

In the image processing apparatus, in a case of the focus adjustment of the projector, in order that the grayscale pattern of the captured adjustment image obtained by imaging the adjustment image which is projected on the projection surface is close to the grayscale pattern of the adjustment image, the adjustment image to be produced may be changed. Therefore, it is possible to suppress an influence due to the projection state of the projector at a starting point of the focus adjustment and to improve an accuracy of the focus adjustment.

APPLICATION EXAMPLE 2

This application example of the invention is directed to an image processing apparatus used in a projector which projects and displays an image on a projection surface, the image processing apparatus including: an adjustment image producing section that produces an adjustment image for adjusting a focus of a projected image displayed on the projection surface; an imaging section that images the adjustment image projected on the projection surface, wherein the adjustment image producing section obtains an index value that indicates a degree of suitability for a focus adjustment from a difference in a grayscale variation of a grayscale pattern of the a captured adjustment image obtained by imaging, and changes the adjustment image to be produced such that the index value exceeds a threshold value when the obtained value is equal to or less than a predetermined threshold value.

In the image processing apparatus, in a case of the focus adjustment of the projector, the index value indicating a degree of the suitability for the focus adjustment from the difference in the grayscale variation of the grayscale pattern of the captured adjustment image obtained by imaging the adjustment image which is projected on the projection surface may be obtained and the adjustment image to be produced may be changed such that the obtained index value exceeds the threshold value. Therefore, it is possible to perform the focus adjustment using a high degree adjustment image suitable for the focus adjustment. Accordingly, it is possible to suppress an influence of the projection state of the projector at a starting point of the focus adjustment and thus to improve an accuracy of the focus adjustment.

APPLICATION EXAMPLE 3

This application example of the invention is directed to the image processing apparatus according to Application Example 1 or 2, wherein the adjustment image is an image of the grayscale pattern having repeated brightness and darkness, the adjustment image producing section changes the adjustment image to be produced by changing either a width of a bright image portion corresponding to the brightness of the adjustment image or an interval interposed between the bright image portions, according to a relationship between the grayscale pattern of the adjustment image and the grayscale pattern of the captured adjustment image, when the adjustment image to be produced is changed.

In the image processing apparatus, by changing either the width of the bright image portion corresponding to brightness of the adjustment image or the interval interposed between the bright image portions, it is possible to easily change the adjustment image.

APPLICATION EXAMPLE 4

This application example of the invention is directed to the image processing apparatus according to Application Example 1 or 2, which further includes: an adjustment image information storing section that stores a plurality of the adjustment images having different grayscale patterns in advance, wherein the adjustment image producing section changes the adjustment image to be produced by selecting one from the plurality of adjustment images.

In the image processing apparatus, by selecting one from the plurality of the adjustment images, the adjustment image to be produced may be changed. Therefore, it is possible to produce the adjustment image easily and efficiently.

APPLICATION EXAMPLE 5

This application example of the invention is directed to the image processing apparatus according to any one of Application Examples 1 to 4, wherein the adjustment image producing section produces an initial adjustment image according to projecting condition information relating to a projecting condition including at least a projecting distance of the projector when starting the focus adjustment.

In the image processing apparatus, according to the projection condition information of the projector when starting the focus adjustment, the adjustment image in which the influence of the projection condition is suppressed in advance is produced as the initial adjustment image. Therefore, it is possible to efficiently change the adjustment image to be produced thereafter.

APPLICATION EXAMPLE 6

This application example of the invention is directed to a projector projecting an image on a projection surface including: the image processing apparatus according to any one of Application Examples 1 to 5 and a projecting section that projects the image.

APPLICATION EXAMPLE 7

This application example of invention is directed to a control method of a projector which projects and displays an image on a projection surface, the method including: (a) producing an adjustment image for adjusting a focus of a projected image to be displayed on the projection surface; (b) projecting the adjustment image on the projection surface; and (c) imaging the adjustment image projected on the projection surface, wherein the producing an adjustment image (a) includes changing the adjustment image to be produced, such that a grayscale pattern of a captured adjustment image is close to a grayscale pattern of the adjustment image.

In the control method, in a case of the focus adjustment of the projector, in order that the grayscale pattern of the captured adjustment image obtained by imaging the adjustment image which is projected on the projection surface is close to the grayscale pattern of the adjustment image, it is possible that the adjustment image to be produced may be changed.

Therefore, it is possible to suppress an influence of the projection state of the projector at a starting point of the focus adjustment and to improve an accuracy of the focus adjustment.

APPLICATION EXAMPLE 8

This application example of the invention is directed to a control method of a projector which projects and displays an image on a projection surface, the method including: (a) producing an adjustment image for adjusting a focus of a projected image to be displayed on the projection surface; (b) projecting the adjustment image on the projection surface; and (c) imaging the adjustment image projected on the projection surface, wherein the producing an adjustment image (a) includes changing the adjustment image to be produced by obtaining an index value that indicates a degree of a suitability for a focus adjustment from a difference in a grayscale variation of a grayscale pattern of a captured adjustment image obtained, such that the index value exceeds a threshold value when the obtained value is equal to or less than a predetermined threshold value.

In the control method, in a case of the focus adjustment of the projector, the index value indicating a degree of a suitability for the focus adjustment from the difference in the grayscale variation of the grayscale pattern of the captured adjustment image obtained by imaging the adjustment image projected on the projection surface can be obtained, and thus the adjustment image to be produced can be changed such that the obtained index value exceeds the threshold value. Therefore, it is possible to suppress an influence of the projection state of the projector at a starting point of the focus adjustment and thus to improve an accuracy of the projection.

In addition, when the adjustment image to be produced is changed, the image processing apparatus according to the Application Example 3 is enabled to perform the following description. When the grayscale value of the brightness of the captured adjustment image corresponding to the grayscale value of the brightness of the adjustment image is low, either the width of the bright image portion is allowed to be thick or the interval interposed between the bright image portions is allowed to be broad. In addition, when the gray scale value of the darkness of the captured adjustment image corresponding to the grayscale value of the darkness of the adjustment image is high, either the width of the bright image portion of the adjustment image is allowed to be thin or the width interposed between the bright image portion of the adjustment image is allowed to be broad. In addition, when the grayscale value of the darkness of the captured adjustment image corresponding to the grayscale value of the darkness of the adjustment image is high and a repetitive interval between the brightness and the darkness of the captured adjustment image is board compared to the repetitive interval of the brightness and the darkness of the adjustment image, the width of the bright image portion of the adjustment image is allowed to be thin. In addition, when the width of the dark image portion of the captured adjustment image corresponding to the interval interposed between the bright image portions of the adjustment image is broad, the interval interposed between the bright image portions is allowed to be narrow. Further, when the grayscale pattern of the captured adjustment image rises upward to the right or falls downward to the right, either the width of the bright image portion of the adjustment image corresponding to the portion having a low grayscale value of the grayscale pattern of the captured adjustment image is allowed to be thick or the interval interposed between the bright image portions of the adjustment image corresponding to the portion having a low grayscale value of the grayscale pattern of the captured adjustment image is allowed to be broad.

In addition, in the image processing apparatus according to Application Example 1 or Application Example 2, when the adjustment image to be produced is changed, only a portion of the adjustment image before a change may be limited to a target for the adjustment image to be changed.

In this case, the target of the adjustment images to be changed is limited to only a portion of the adjustment image before the change and thus the adjustment images to be produced become decreased. Therefore, it is possible to efficiently determine the adjustment image used in the focus adjustment by efficiently changing the adjustment image to be produced.

In addition, the invention can be variously realized using various aspects such as an image display apparatus, a projector, a control method of a projector, a computer program for controlling a projector and a recording medium that stores a computer program.

BRIEF DESCRIPTION OF THE DRAWINGS

The invention will be described with reference to the accompanying drawings, wherein like numbers reference like elements.

FIG. 11A is an explanatory view illustrating an example of a plurality of adjustment images prepared in advance.

DESCRIPTION OF EXEMPLARY EMBODIMENTS

Preferred modes for performing the invention will be described below in the following sequence based on an embodiment.

Figure 1:
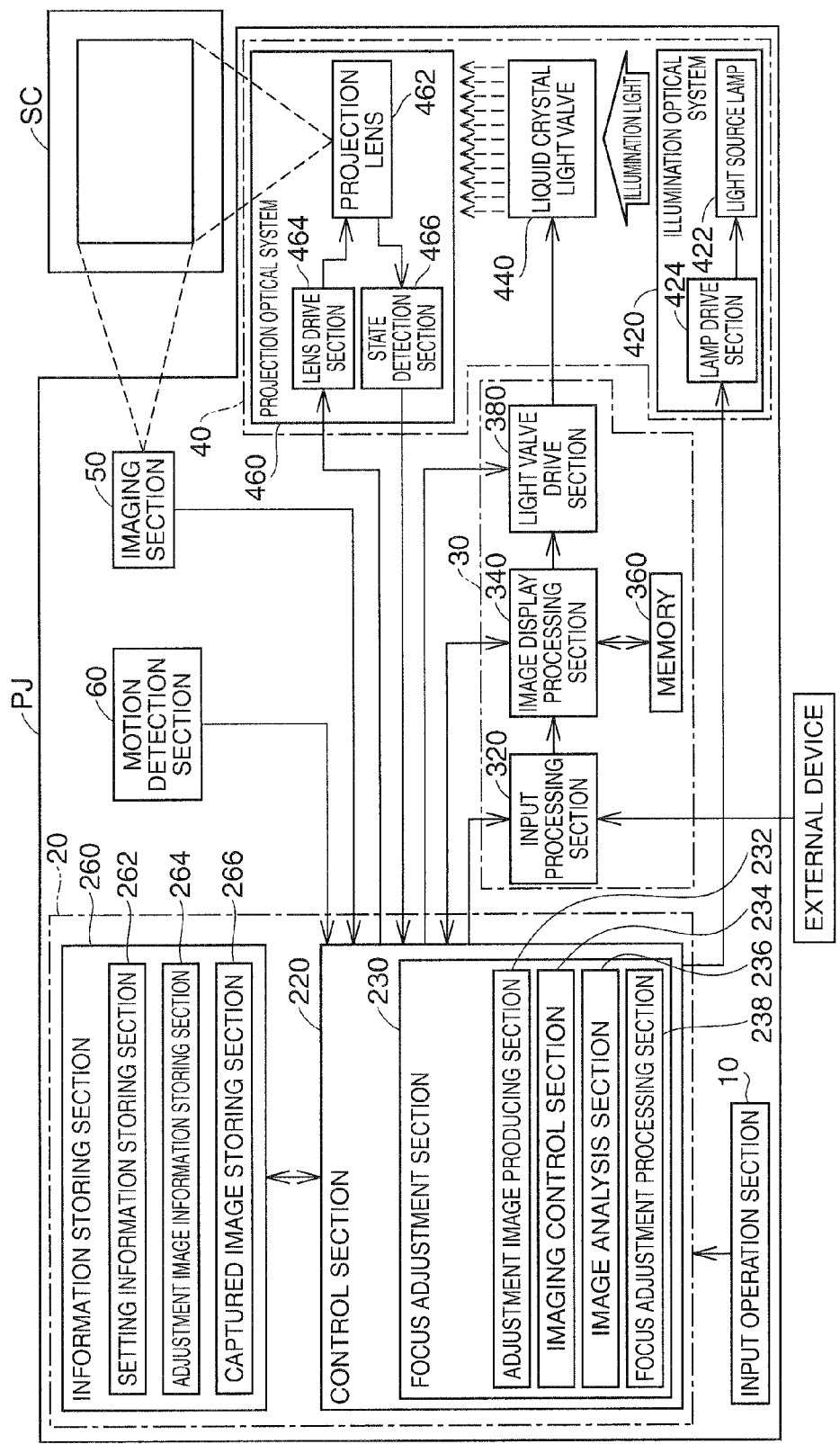
FIG. 1 is a block diagram schematically illustrating a configuration of a projector in a first embodiment.

A. First Embodiment
B. Second Embodiment
C. Third Embodiment
D. Modification Example
A. First Embodiment
A1. Configuration of Projector FIG. 1 is a block diagram schematically illustrating a configuration of a projector in a first embodiment. A projector PJ includes an input operation section 10, a control circuit 20, an image processing operation circuit 30, an image projecting optical system 90, an imaging section 50 and a motion detection section 60.

The input operation section 10 is configured by a button and a key provided in a remote controller (not illustrated) and a projector PJ, and outputs instruction information to the control circuit 20 according to an operation by a user. For example, instruction information of start and end of a focus adjustment process described below is input to the control circuit 20 by a user.

The image projecting optical system 40 produces image light displaying an image, and enlarges and projects the image through making an image formation on a screen (a projection surface) SC. The image projecting optical system 40 includes an illumination optical system 420, a liquid crystal light valve 440 and a projection optical system 460.

The illumination optical system 420 includes a light source lamp 422 and a lamp drive section 424. As light source lamp 422, a light source lamp of a discharge emission type such as a super high pressure mercury lamp and a metal halide lamp and or a variety of self-luminous elements such as a light emitting diodes and an organic EL (Electro Luminescence) may be used. The lamp drive section 424 drives the light source lamp 422 based on a control of the control circuit 20.

The liquid crystal light valve 440 is configured by a transmission liquid crystal panel on which a plurality of pixels are disposed in a matrix shape. An operation of a liquid crystal of each pixel is controlled, based on a drive signal from a light valve drive section 380 of the image processing operation circuit 30 described below, and thus illumination light emitted from the illumination optical system 420 is converted into the image light displaying the image. In addition, in the embodiment, the liquid crystal light valve 440 includes three liquid crystal light valves for three color components of red (G), green (G) and blue (B) (not illustrated). However, a monochrome image may be projected using one liquid crystal light valve.

The projection optical system 460 forms on the screen SC the image light projected from the liquid crystal light valve 440 and thus enlarges and projects the image on the screen SC. The projection optical system 460 includes a projection lens 462, a lens drive section 464 and a state detection section 466. The projection lens 462 is configured such that a focus lens (not illuminated) for focus adjustment and a zoom lens (not illuminated) for a zoom adjustment are movable in the optical axis, and enlarges the image light projected from the liquid crystal light valve 440 according to a zoom position of the zoom lens, and images the projected image light according to the focal position of the focus lens, whereby the image displaying the image light is enlarged and projected on the screen SC. The lens drive section 464 changes the position (hereinafter, referred to as a "focal position") in an optical axis direction of the focus lens, based on a control of the control circuit 20. Further, the lens drive section 464 changes the position (hereinafter, referred to as a "zoom position") in the optical axis direction of the zoom lens. The state detection section 466 detects the focal position of the focus lens and the zoom position. In addition, since the projection optical system 460 is generally, configured, a specific configuration will not be illustrated and described.

The image processing operation circuit 30 includes an input processing section 320, an image display processing section 340, a memory 360 and a light valve drive section 380. The input processing section 320 performs an A/D conversion when necessary, with respect to the input image signal supplied from an external device, based on the control of the control circuit 20, and converts the signal into a digital image signal which can be processed in the image display processing section 340. When the digital image signal output from the input processing section 320 is written in the memory 360 for each frame and is read based on the control of the control circuit 20, the image display processing section 340 performs various image processes such as a resolution conversion process, a keystone correction process and the like. The light valve drive section 380 drives the liquid crystal light valve 440 according to the digital image signal which is input from the image display processing section 340. The light valve drive section 380 may be provided in the image projecting optical system 40 instead of the image processing operation circuit 30.

The imaging section 50 images the adjustment image as a projected image which is enlarged and projected on the screen SC, based on the control of the control circuit 20, and outputs the image signal according to the captured adjustment image to the control circuit 20. The imaging section 50, for example, is configured by using a COD camera having the COD (Charge Coupled Device) as an imaging element. In addition, the adjustment image will be described below.

The motion detection section 60 detects a surrounding of a projection axis, a motion of the longitudinal direction and the horizontal direction, and a stop of the motion in the projector PJ. In addition, the motion detection section may be configured by using various sensors which detects the motion and the stop of the motion, such as an angular velocity sensor, an acceleration sensor and a gyro sensor and the like.

The control circuit 20 is a computer having a CPU, a ROM, RAM and the like, and configures a control section 220 and an information storing section 260 by executing a control program. The control section 220 is operated as various control function sections that control the image processing operation circuit 30, an image projecting optical system 40, the imaging section 50 and the motion detection section 60 according to the executed control program. The information storing section 260 is operated as various storing sections which store information for various controls. FIG. 1 illustrates a focus adjustment section 230 that controls the focus adjustment described below, as an example of the control function section of the control section 220. The user instructs the focus adjustment section 230 to start the focus adjustment from the input operation section 10 and thus the focus adjustment section 230 is operated by executing the corresponding program. FIG. 1 illustrates, as an example of the storing section of the information storing section 260, a setting information storing section 262 that stores setting information for various controls by the control section 220, an adjustment image information storing section 264 that stores the adjustment image information described below, and a captured image storing section 266 that stores image data of the image captured by the imaging section 50.

The focus adjustment section 230 includes an adjustment image producing section 232, an imaging control section 234, an image analysis section 236 and a focus adjustment processing section 238. The adjustment image producing section 232 generates the image data of the adjustment image for adjusting the focus. The imaging control section 234 controls the imaging section 50, captures the adjustment image projected on the screen SC, and stores the captured adjustment image in a captured image storing section 266. The image analysis section 236 analyzes the captured adjustment image. In addition, the image analysis section 236 may be provided in the adjustment image producing section 232. The focus adjustment processing section 238 controls the state detection section 466 and the lens drive section 464 and executes the focus adjustment. The focus adjustment section 230 will be described again below.

In addition, in the embodiment, the adjustment image producing section 232 and the image analysis section 236 are equivalent to the adjustment image producing section according to the invention and the imaging section 50 or the imaging section 50 and the imaging control section 234 are equivalent to the imaging section according to the invention. In addition, the control circuit 20, the image processing operation circuit 30 and the imaging section 50 are equivalent to the image processing apparatus according to the invention.

A2. Operation of Projector

Operation Explanation of Focus Adjustment

Figure 2:
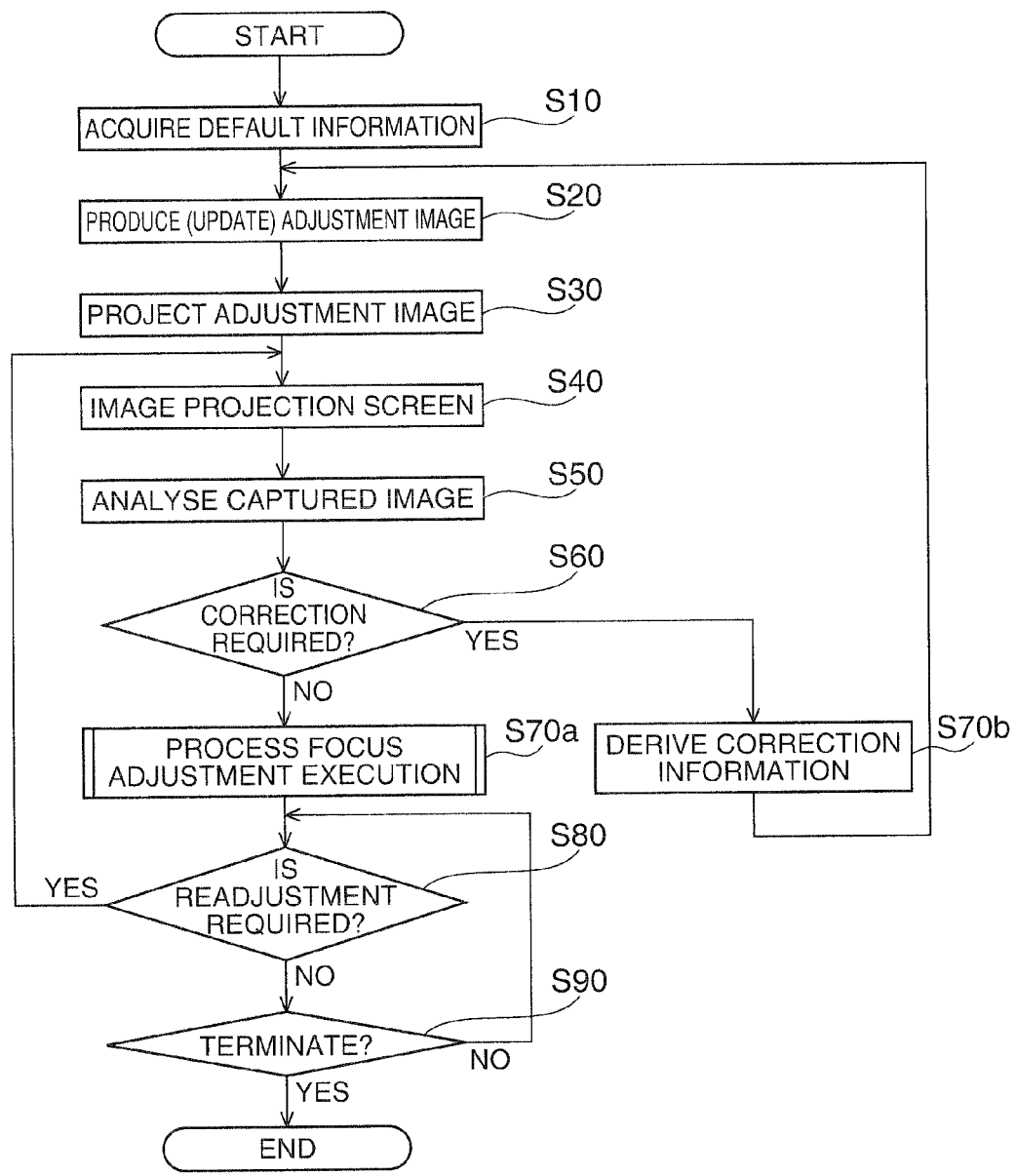
FIG. 2 is a flowchart illustrating a flow of a focus adjustment process in a first embodiment.

FIG. 2 is a flowchart illustrating a flow of a focus adjustment process in the embodiment. If the focus adjustment section 230 (FIG. 1) of the control section 220 starts a focus adjustment process, first, default information is obtained by the adjustment image producing section 232 of the focus adjustment section 230 as the adjustment image information for producing the adjustment image that is initially projected and displayed so as to adjust a focus control (S10).

Figure 3:
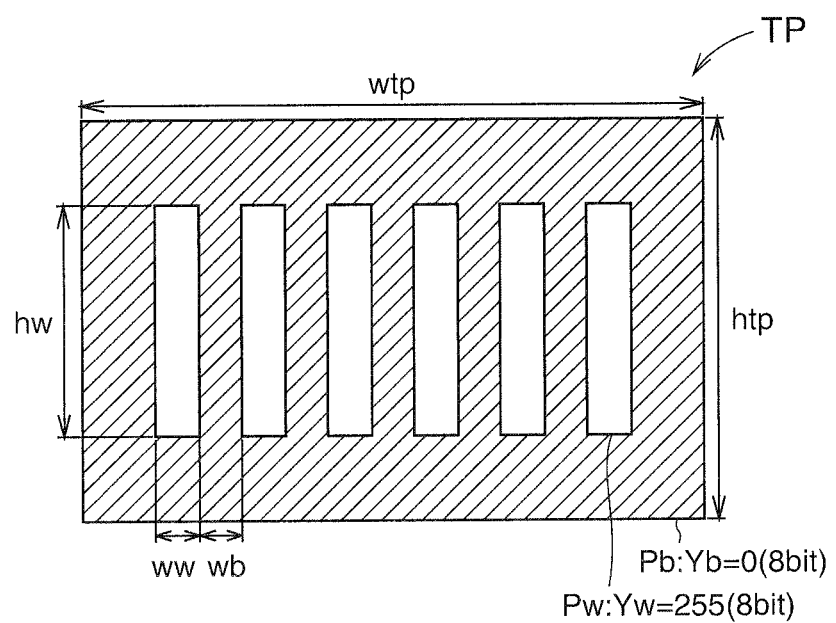
FIG. 3 is an explanatory view illustrating an adjustment image used in a focus adjustment.

Herein, FIG. 3 is an explanatory view illustrating an adjustment image used in a focus adjustment. The adjustment image TP is a stripe pattern image in which a plurality (six in an example of the drawing) of white images Pw (a grayscale value of luminance Yw: 255: (8 bits)) having a rectangular shape are arranged, with being spaced in the horizontal direction on a black background image Pb (a grayscale value of luminance Yb: 0 (8 bits)), and having the rectangular shape. In FIG. 3, a width of the black background image Pb is represented by wtp and the height thereof is represented by htp. In addition, a width of the white image Pw is represented by ww ($<$wtp), a height of thereof is represented by hw ($\leq$htp) and an interval thereof is represented by wb. In addition, the width wtp, the height htp, and the grayscale value Yb of the black background image Pb of the adjustment image of the default and the width ww, the height hw and the grayscale value Yw of the white image Pw are stored in the adjustment image information storing section 264 (FIG. 1) as the default information. Therefore, the adjustment image producing section 232 obtains the default information of the adjustment image information with reference to the adjustment image information storing section 264. In addition, the grayscale value Yw of the white image Pw and the grayscale value Yb of the black background image Pb are normally a predetermined constant value respectively and thus may be omitted.

Then, the adjustment image is produced based on the default information of the adjustment image information obtained by the adjustment image producing section 232, and the image data of the produced adjustment image (hereinafter, referred to as "adjustment image data") is output to the image display processing section 340 of the image processing operation circuit 30 (FIG. 1) (step S20). The image display processing section 340, a light valve drive section 380 and the image projecting optical system 40 (FIG. 1) are controlled by the focus adjustment section 230 and thus various settings such for a focal position, a zoom position and the like remain unchanged in a current stage. Then, the adjustment image TP displaying the adjustment image data output to the image display processing section 340 is projected and displayed on the screen SC (step S30).

Then, the imaging section 50 is controlled by the imaging control section 234 of the focus adjustment section 230 (FIG. 1), the adjustment image that is a projected image which is projected and displayed on the screen SC is captured, the image data (referred to as an "captured image data" or a "captured adjustment image data) of the captured image (referred to as "captured image" or "captured adjustment image") is obtained and then the data is stored in the captured image storing section 266 (step S40).

Next, the analysis on the captured image is performed by the image analysis section 236 (FIG. 1) of the focus adjustment section 230 as described below (step S50), and it is determined whether to correct the projected and displayed adjustment image (step S60).

Figure 4:
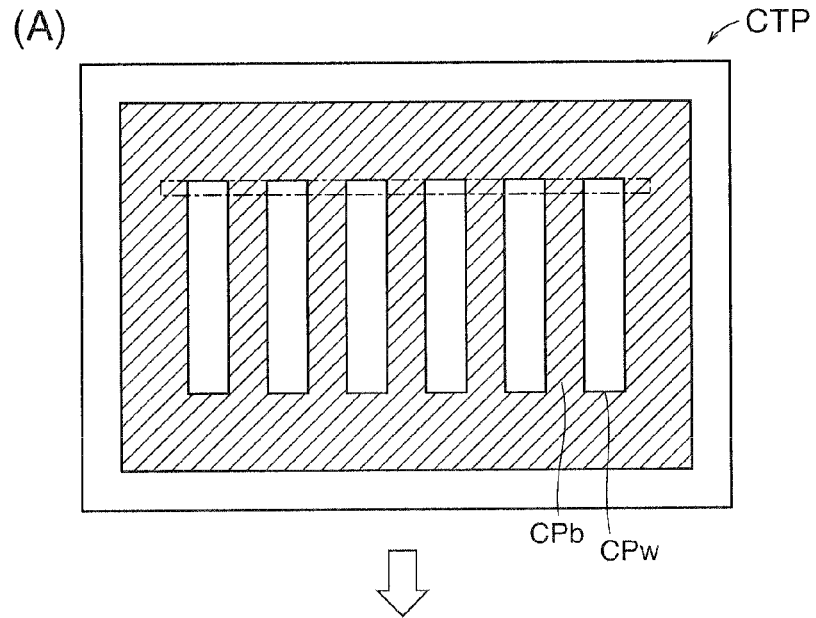
FIG. 4A is a schematic diagram illustrating the obtained captured adjustment image CTP.
FIG. 4B illustrates an analysis result of the captured adjustment image CTP and a determination on whether to correct the image.
Figure 4:
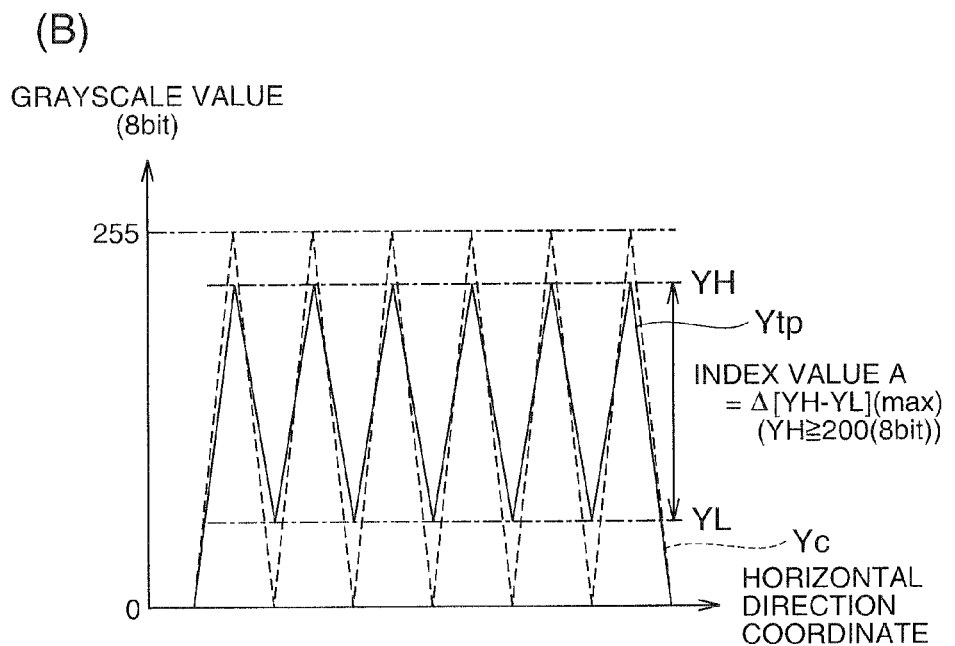

FIG. 4 is an explanatory view illustrating a captured image analysis executed by an image analysis section and a determination on whether to correct an adjustment image. FIG. 4A is a schematic diagram illustrating the obtained captured adjustment image CTP. FIG. 4B illustrates an analysis result of the captured adjustment image CTP and a determination on whether to correct the image.

As illustrated in FIG. 4A, the image data of a stripe image of one line indicated by a frame of a dashed line is read from the captured adjustment image data stored in the captured image storing section 266. A little wider range than a range of the stripe image is read, instead of end to end reading of the stripe image. A graph in FIG. 4B illustrates a variation state (hereinafter, referred to as "grayscale pattern") of a grayscale value of the read image data. When one line of the stripe image is read, a grayscale pattern Yc indicated by a broken line of FIG. 4B schematically illustrates a state of a grayscale variation which should be theoretically obtained in a case where various losses are ignored. In addition, hereinafter, the grayscale pattern Yc is referred to as an "ideal grayscale pattern" or a "theoretical grayscale pattern". However, as illustrated by a solid line in FIG. 4B, an grayscale pattern Ytp actually read deviates from the ideal grayscale pattern Yc, based on projection conditions such as a deviation degree of focus, a zoom state, a resolution of the imaging section 50, a projection distance, ambient light and screen state (color and material) and the like. For example, a grayscale value YR of a portion CPw where the white image Pw (hereinafter, referred to as a "captured white image") is captured and a grayscale value YL of a portion (Cpb) of a black background image Pb between captured white images CPw (hereinafter, referred to as a "captured interval black image") become values which deviate from the ideal state values.

Therefore, starting from the left end, the grayscale value YH of the captured white image CPw and the grayscale value YL of the captured interval black image CPb are sequentially read, the difference Δ [YR−YL] is obtained and thus a maximum value Δ [YR−YL] (max) of the difference Δ [YH−YL] is set to be an index value A that shows a degree indicating whether the focus adjustment described below is suitable or not. However, the grayscale value to be obtained as the difference is limited to a case where the grayscale value YH of the captured white image CPw is YH≥200 (8 bits).

Then, when a case of YR≥200 is not present in the grayscale value YH of the read captured white image Cpw, it is determined that the correction of an adjustment image is required. This is because when the grayscale value YH of the captured white image CPw is YH<200, with respect to the grayscale value of the original white image Pw Yw=255 (8 bits), it is considered that the obtained difference accuracy is decreased and thus it is difficult to obtain an accurate analysis. However, the grayscale value YH is not limited thereto, and may be a value that is appropriately changed according to the projection conditions and may be approximately YH≥160 to 196.

In addition, when the threshold value Yth of the index value A is set to be Yth=50 (8 bits) and then A≤Yth, it is determined that the correction of the adjustment image is required. This is because as described in the related art, if the difference Δ [YH−YL] is not more than approximately 50 and if the focal position of the focus lens is changed, the variation amount is also decreased and thereby it is considered that there is a high possibility of a problem such as a difficulty in obtaining an accurate adjustment. On the other hand, when A>Yth, it is determined that the correction is not required (no correction). In addition, the value of the threshold value Yth is not limited thereto, but may be a value which can be appropriately changed according to the accuracy and the like required for the projection condition or the focus adjustment. Ideally, the higher the threshold value is, the higher the accuracy is during the focus adjustment, but it becomes difficult to generate the adjustment image so as to be A>Yth and there is an increased possibility to determine that the correction is required more than necessary. Thereby, the threshold value Yth is set in consideration of these conditions.

Then, when it is determined that the correction of the adjustment image is not required (no correction) (step S60: NO), a focus adjustment execution process is performed by the focus adjustment processing section 238 (FIG. 1) of the focus adjustment section 230 (step S70a). The focus adjustment execution process is performed using various general methods. To illustrate briefly, for example, while the focal position of the focus lens is changed, the integrated value is obtained in which the difference (referred to as a "difference in grayscale value" or "contrast value") between the grayscale value YH of the white image area to which of the stripe pattern of captured adjustment image is adjacent and the grayscale value YL of the black image area is integrated in sequence. Then, a position where the obtained integrated value becomes maximum is set to be the focused position and thus the focus adjustment is performed. When the focal position where the integrated value becomes maximum is obtained, the focus adjustment may be performed. In addition, when the focus is matched, the integrated value is set to be a reference integrated value, and the focal position is adjusted so that the obtained integrated value coincides with the reference integrated value. In this manner, it is also possible to perform the focus adjustment.

On the other hand, when it is determined that the correction of the adjustment image is required (step 60: YES), the correction information of the adjustment image is obtained (step S70b) by the adjustment image producing section 232. Then, the process returns to the step S20 based on the obtained correction information, the adjustment image is updated, and the image data of the updated adjustment image is output to the image display processing section 340. In step S60, until it is determined that the correction of the adjustment image is not required, the processes in steps S 20 to step S70b are repeated. In addition, the derivation of the correction information will be further described.

When the focus adjustment process is performed (step S70a), a determination on whether the focus adjustment process is required or not (step S80) again and a determination to terminate the focus adjustment (step S90) are performed. When the termination of the focus adjustment is instructed from the input operation section 10 by the user, it is determined that the focus adjustment is terminated (step S90: YES), and a series of focus adjustment processes is terminated. In contrast, while it is not determined that the focus adjustment process is required to be performed again (step S80: NO) without being determined that the focus adjustment is terminated (step S90: NO), a standby process is unchanged. Then, when it is determined that the focus adjustment process is required to be performed again (step S80: YES), the process returns to step S40. Then, capturing the adjustment image that is the projection image, an image analysis in step S50 and a determination on whether to correct the adjustment image in step S60 are performed, and the focus adjustment execution process in step S70a and the correction information derivation process in step S70b are performed again according to the determination on whether to correct.

Correction Description of Adjustment Image

Figure 5A:
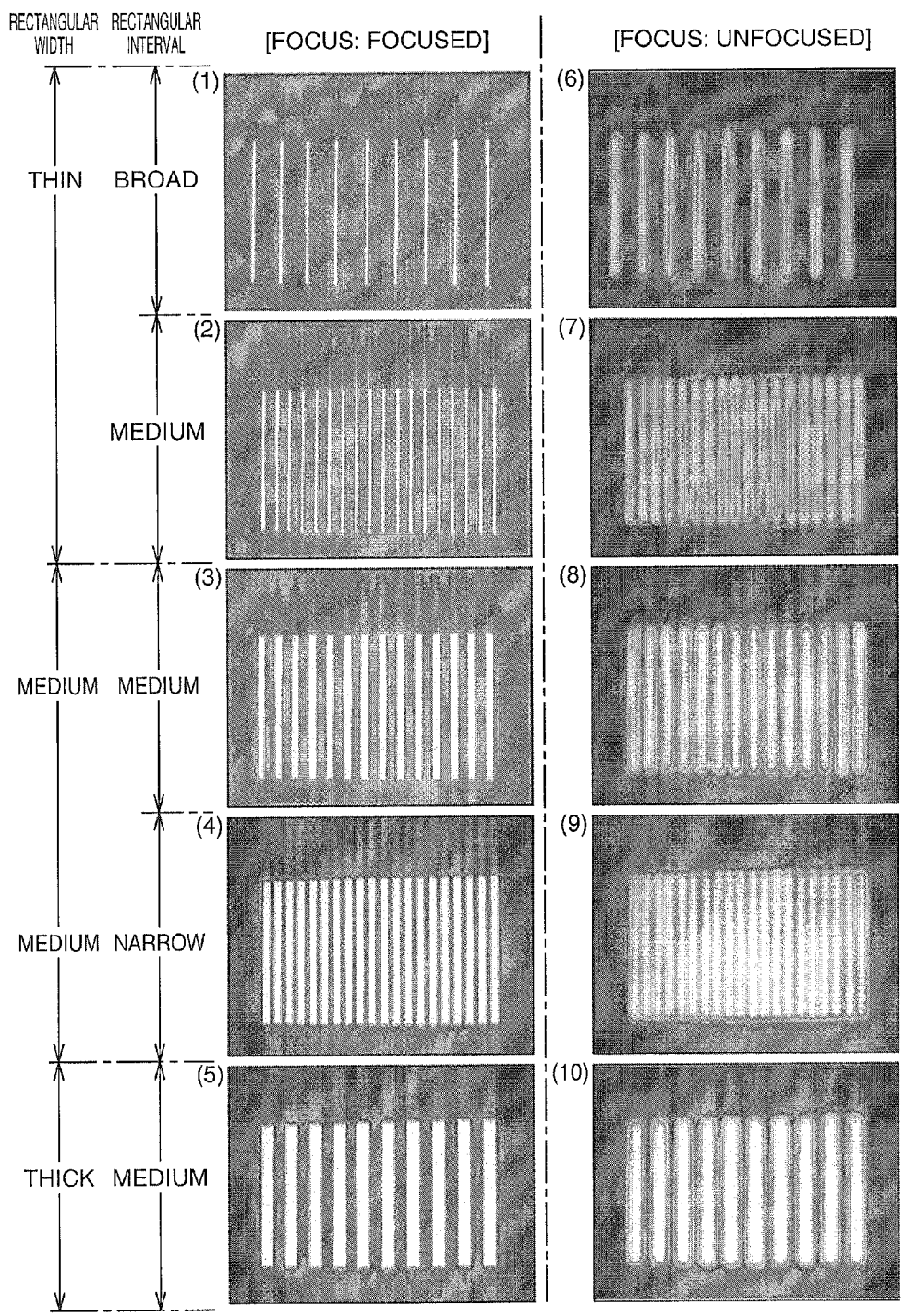
FIG. 5A is an explanatory view illustrating an example of a captured adjustment image.
Figure 5B:
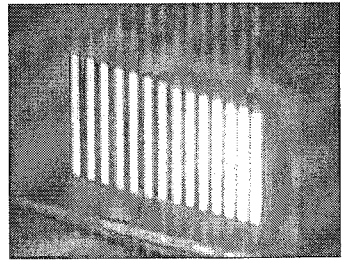
FIG. 5B is an explanatory view illustrating an example of captured adjustment image.

Some detailed examples of a derivation of the correction information in step S70b will be described with reference to FIG. 5A, FIG. 5B and FIGS. 6A to 6G. FIGS. 5A and 5B are explanatory views illustrating an example of the captured adjustment image.

FIG. 5A is an example of an captured adjustment image CTP captured by projecting the adjustment image TP on the screen SC produced in combination of a thin, medium and thick of width ww of the white image Pw illustrated in FIG. 3, (hereinafter, referred to as a "rectangular width") and a narrow, medium and broad of interval wb (hereinafter, referred to as a "rectangular interval"). As an example illustrated in FIG. 5A, (1) and (6) indicate a case where the rectangular width ww is thin and the rectangular interval wb is broad, (2) and (7) indicate a case where the rectangular width ww is thin and the rectangular interval wb is medium, (3) and (8) indicate a case where the rectangular width ww is medium and the rectangular interval wb is medium, (4) and (9) indicate a case where the rectangular width ww is medium, the rectangular interval wb is narrow, and (5) and (10) indicate a case where the rectangular width ww is thick and the rectangular interval wb is medium. In addition, the left (1) to (5) are an image imaged in a focused state, and (6) to (10) are images captured in an unfocused state with respect to the same image as (1) to (5). In addition, FIG. 5B is an example of the captured adjustment image that is captured by obliquely projecting the adjustment image where the rectangular width ww of the white image Pw is medium and the rectangular interval wb is medium, on the screen SC from obliquely rightward below.

As in (1) to (5) of FIG. 5A, when the focus is deviated with respect to the focused image, as illustrated in (6) to (10) of FIG. 5A, a portion of the captured white image CPw capturing the white image Pw is blurred and spread, and a boundary of a portion of the captured interval black image CPb and a portion of the imaging white image CPw between the captured white images CPw becomes unclear. Therefore, the portion of the spread and blurred captured white image CPw becomes dark and thus there is a case where the detected grayscale value is decreased. For example, as illustrated in (6) and (7) of FIG. 5A, in the relation between the rectangular width ww and the rectangular interval wb, the decreased grayscale value is particularly noticeable in the case of the rectangular width ww<the rectangular interval wb. In this case, as illustrated in FIG. 4, the grayscale value YH of the portion of the captured white image CPw becomes YH<200 or the index value A becomes A≤Yth compared with the threshold value Yth. Therefore, it becomes possible to determine that the correction of the adjustment image is required. In addition, the portion of the captured interval black image CPb becomes bright and as illustrated in (8) to (10) of FIG. 5A, there is a case where the detected grayscale value is increased. For example, as illustrated in (9) of FIG. 5A, in a case of the rectangular width ww>rectangular interval wb, the state occurring is noticeable. In this case, as illustrated in FIG. 4, the index value A becomes A≤Yth compared with the threshold value Yth, and thus it becomes possible to determine that the correction of the adjustment image is required. In addition, even in the focused images of (1) to (5) of FIG. 5A, depending on the resolution of an image camera of the imaging section 50, characteristics of the imaging, an influence of ambient light and the like, there is a case where the white image is captured darkly or brightly saturated, a case where the background image is brightly captured, a case where the image is captured in a unfocused state or the like. Accordingly, there is possibility also to determine that the correction of the adjustment image is required. Therefore, in the following description, it is assumed that the case of the image (5) of FIG. 5A indicates the ideal grayscale pattern Yc illustrated in FIG. 4B. In addition, the images of (1) and (2) of FIG. 5A indicate a portion of the captured white image CPw being dark and a portion of the image interval black image CPb being bright, and the images (3) and (4) of FIG. 5A indicate a portion of the imaging interval black image CPb being bright.

Figure 6A:
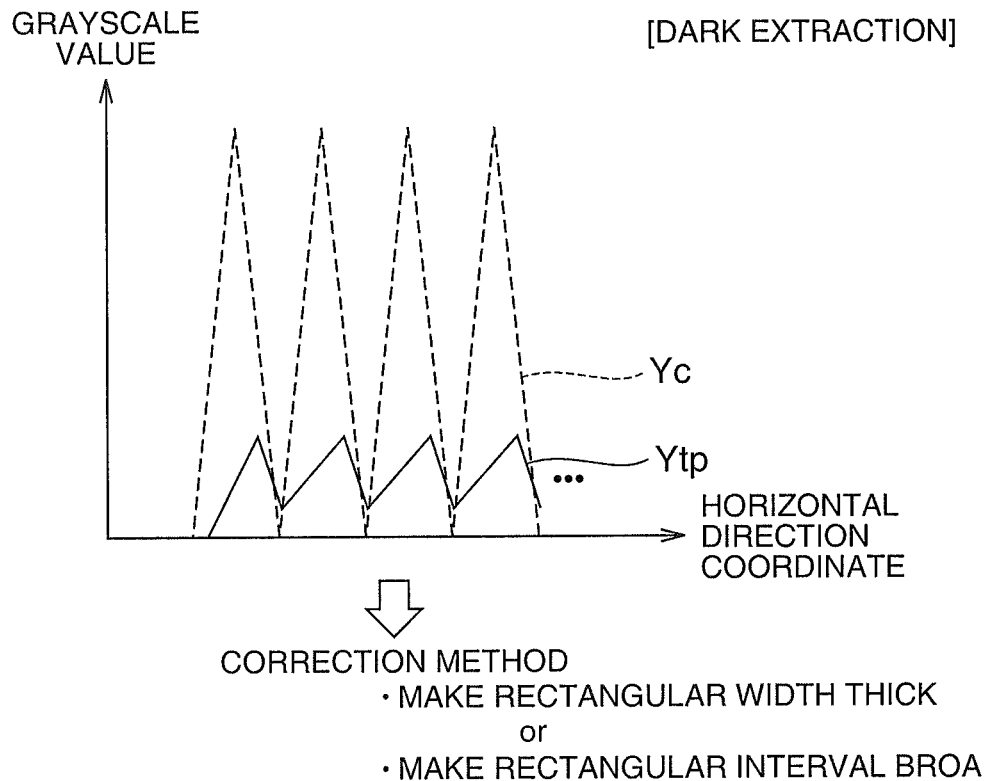
FIG. 6A is an explanatory view illustrating an example of an image analysis result and a correction method.
Figure 6B:
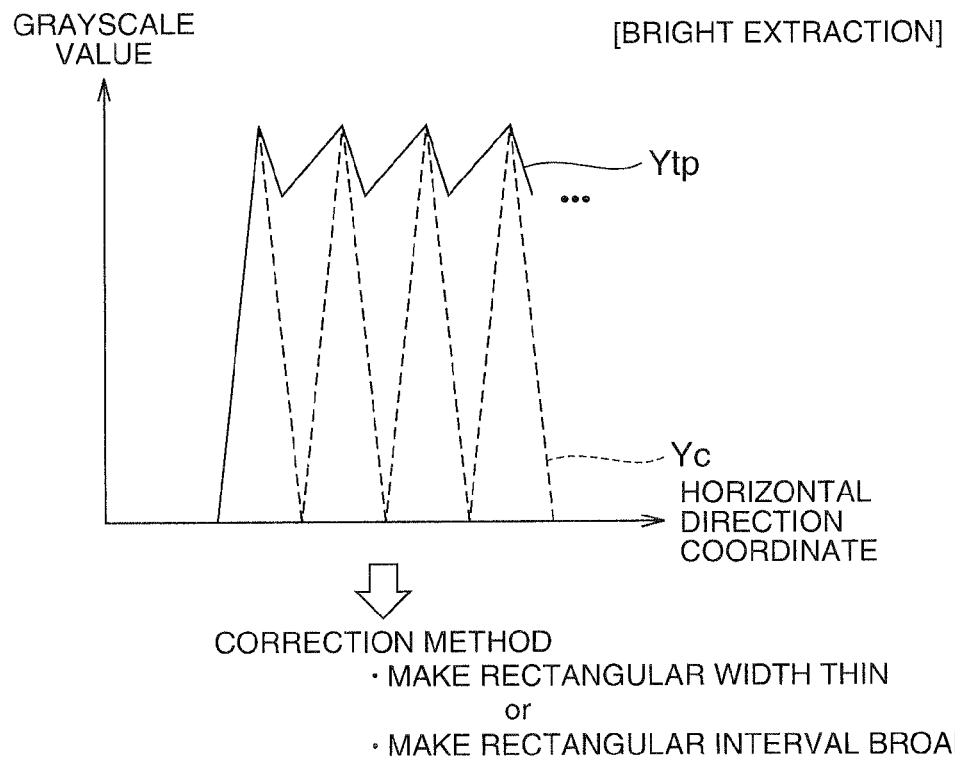
FIG. 6B is an explanatory view illustrating an example of an image analysis result and a correction method.
Figure 6C:
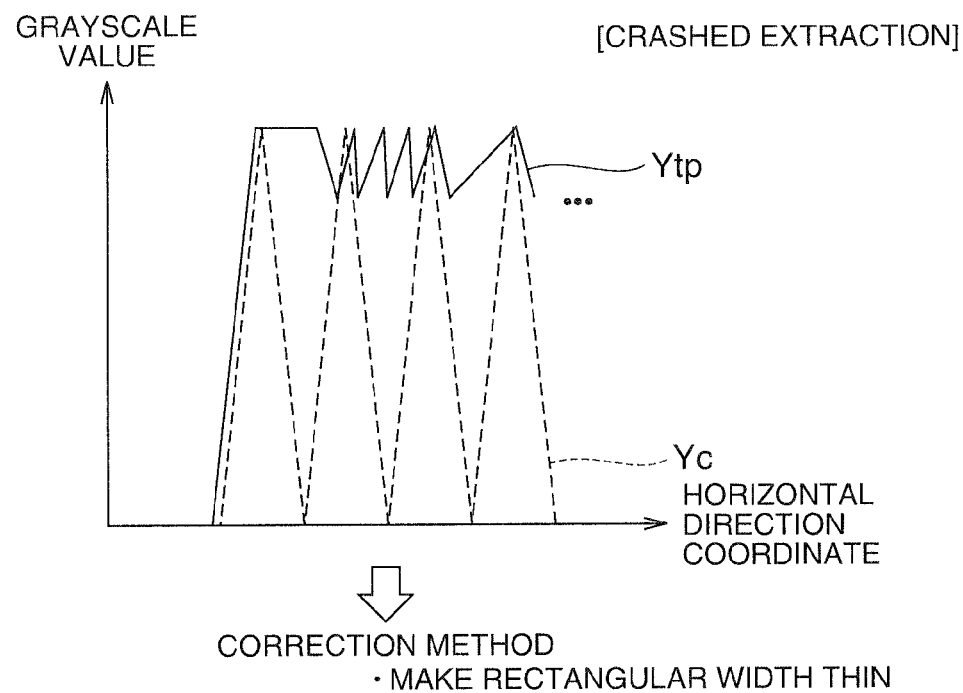
FIG. 6C is an explanatory view illustrating an example of an image analysis result and a correction method.
Figure 6D:
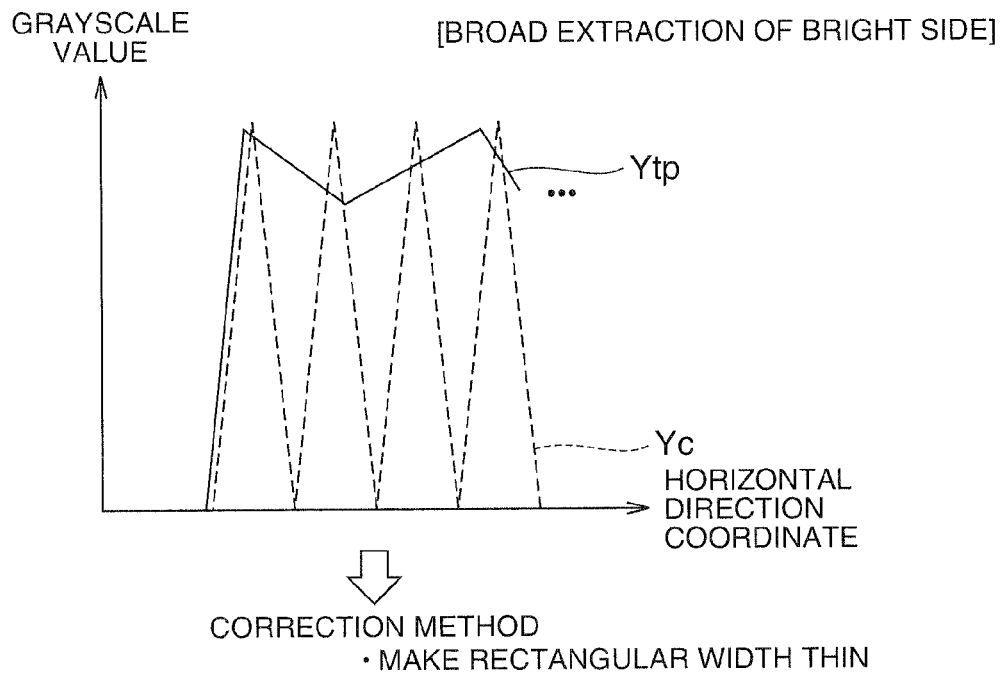
FIG. 6D is an explanatory view illustrating an example of an image analysis result and a correction method.
Figure 6E:
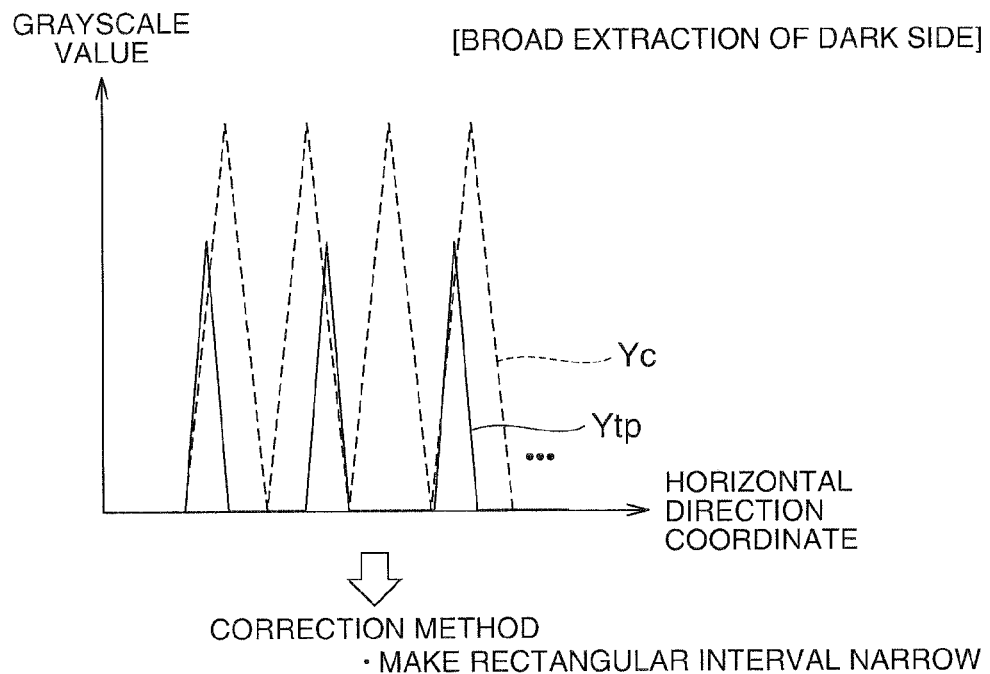
FIG. 6E is an explanatory view illustrating an example of an image analysis result and a correction method.

FIGS. 6A to 6G are explanatory views illustrating an example of the image analysis result and a correction method. FIG. 6A illustrates the case where the portion of the captured white image CPw is darkly imaged, that is, illustrates an example of the grayscale pattern Ytp in which the grayscale value YH of the imaged white image CPw is decreased. For example, such an analysis result is likely to occur in a case of (2) and (7) of FIG. 5A. In addition, when such an analysis result is obtained, it is considered that the rectangular width ww of the white image Pw of the adjustment image TP (FIG. 3) to be produced is to be thick. In addition, it is considered that the rectangular interval wb of the white image Pw is to be wide. It is preferable to determine in advance whether either of a variation of the rectangular width ww or a variation of the rectangular interval wb is first changed. In addition, when the grayscale value YH of a portion of the captured white image CPw is decreased, (1) and (6) of FIG. 5A may be determined to correspond to an example of FIG. 6A. However, in this case, with an aid from the projection of the corrected and updated adjustment image, the imaging and the analysis, the analysis result (described below) of FIG. 6E is obtained and thus the corresponding corrections are performed through the repeated flow of FIG. 2.

FIG. 6B illustrates a case where the portion of the image interval black image CPb is brightly captured, that is, illustrates an example of the grayscale value Ytp in which the grayscale value YH of the portion of the captured interval black image CPb between the captured white images CPw is increased. Such an analysis result, for example, is likely to occur in a case of (4) and (9) of FIG. 5A. When such an analysis result is obtained, it is considered that the rectangular width ww of the white image Pw of the adjustment image TP (FIG. 3) to be produced is to be thin. In addition, it is also considered that the rectangular interval wb of the white image Pw is to be broad. It is preferable to determine in advance whether either the variation of the rectangular width ww or the variation of the rectangular interval wb is first changed. In addition, (8) of FIG. 5A may also correspond to an example of FIG. 6B, depending on a calculation result of the index value A.

The portion of the captured white image CPw is brightly saturated and is captured or the portion of the captured interval black image CPb is brightly imaged. Therefore, FIG. 6C illustrates an example of the grayscale pattern Ytp indicating crushed characteristics in the case where the grayscale pattern of a bright side is crashed. Such an analysis result is likely to occur in a case of (9) of FIG. 5A. In addition, when such an analysis result is obtained, it is considered that the rectangular width ww of the white image Pw of the adjustment image TP (FIG. 3) to be produced is to be thin. In addition, in this case, widening of the rectangular interval wb can also not necessarily be considered. This is because with the aid of the projection, imaging and analysis of the adjustment image updated by the correction which causes the rectangular width ww to be thin, the analysis result of FIG. 6A or FIG. 6B is obtained and thus the corresponding corrections are performed through the repeated flows of FIG. 2.

The portion of the captured white image CPw is blurred and spread or the portion of the captured interval black image CPb is brightly captured. Therefore, FIG. 6D illustrates an example of the grayscale pattern Ytp indicating bright-side spread characteristics in which the grayscale pattern of an overall repetitive brightness and darkness is spread. Such an analysis result, for example, is likely to occur in the case of (10) of FIG. 5A. In addition, when such an analysis result is obtained, it is considered that the rectangular width ww of the white image Pw of the adjustment image TP (FIG. 3) to be produced is to be thin. In addition, in this case, the need to spread the rectangular interval wb is not necessarily to make it wide. This is because with the aid of the projection, the imaging and analysis of the adjustment image updated by the correction which causes the rectangular width ww to be broad, the analysis results of FIG. 6A or FIG. 6B is obtained and the corresponding correction is performed through the repeated flow of FIG. 2.

Figure 6F:
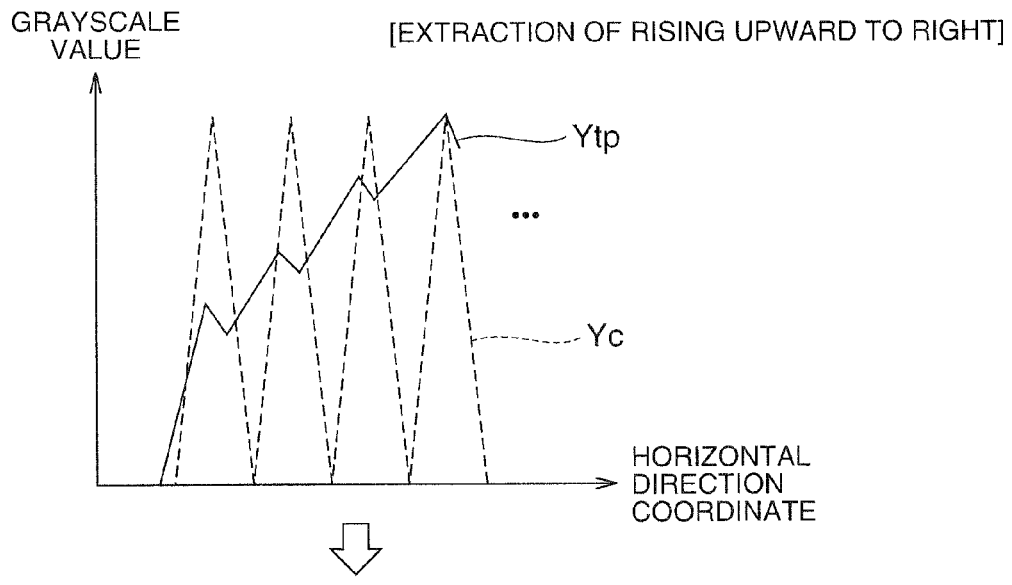
FIG. 6F is an explanatory view illustrating an example of an image analysis result and a correction method.

FIG. 6E illustrates an example of the grayscale pattern Ytp indicating dark side spread characteristics, when the width of the portion of the captured white image CPw is captured to be thin and dark and the portion of the imaging interval black image CPb is captured to be broad. Such an analysis result, for example, is likely to occur in the cases of (1) and (6) of FIG. 5A. In addition, it is considered that the rectangular interval wb of the white image Pw of the adjustment image TP (FIG. 3) to be produced is to be narrow, when such an analysis result is obtained. In addition, in this case, the rectangular width ww of the white image Pw is not necessarily thick. This is because with the aid of the projection, imaging and analysis of the adjustment image updated by the correction which causes the rectangular width wp to be thin, the analysis result of FIG. 6A or FIG. 6B is obtained and thus the corresponding corrections are performed through the repeated flows of FIG. 2.

when the portion of the captured white image CPw and the portion of the captured interval black image CPb are sequentially changed and captured from the dark side to the bright side from the left and the width of the captured interval black image CPb, that is, the interval of the captured white image CPw is sequentially captured to be narrow from the left, FIG. 6F illustrates an example of the grayscale pattern Ytp indicating a rise upward to the right characteristics. Such an analysis result, for example, is likely to occur in the case of FIG. 5B. Then, when such an analysis result is obtained, it is considered that the rectangular width ww of the white image Pw having a portion of a low grayscale value (a decreased portion) is to be thick. In addition, it is also considered that the rectangular interval wb of the white image Pw of the portion having a low grayscale value is to be broad. In addition, it is considered that the rectangular width ww of the white image Pw of the portion having a high grayscale value (an increased portion) is to be decreased. The portion having a low grayscale value, for example, may be divided such that the grayscale value of the grayscale pattern is classified into three, low, medium and high areas, or two low and high areas, it may be determined using various method of dividing a general area such as dividing the low area into the portion having the low grayscale value or dividing the lower portion than a predetermined grayscale value into the portion having the low grayscale value and the like. It is preferable to determine in advance whether either the rectangular width ww or the rectangular interval wb is first changed. The portion having a high grayscale value is not necessarily corrected. For example, this is because with the aid of the projection, imaging and analysis of the adjustment image updated by the correction the analysis result of FIG. 6B, FIG. 6C or FIG. 6D is obtained and thus the corresponding corrections are performed through the repeated flows of FIG. 2.

Figure 6G:
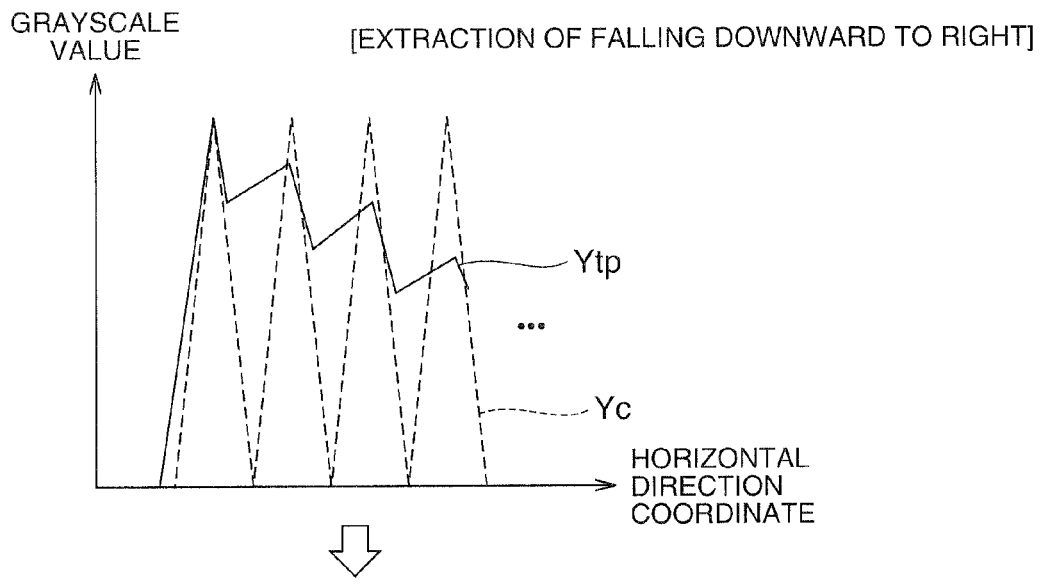
FIG. 6G is an explanatory view illustrating an example of an image analysis result and a correction method.

When the portion of the captured white image CPw and the portion of the captured interval black image CPb are sequentially changed and captured from a dark side to the bright side from the right, and the width of the captured interval black image CPb, that is, the interval wb of the captured white image CPw is sequentially captured to be narrow from the left, FIG. 6G illustrates an example of the grayscale pattern Ytp indicating falling downward toward the right characteristics. Such an analysis result, for example, is likely to occur in the case of the captured adjustment image (not illustrated) captured by obliquely projecting the adjustment image on the screen SC from the obliquely leftward lower, contrary to the case in FIG. 5B. Then, even if such an analysis result is obtained, it is considered that the rectangular width ww of the white image Pw of a portion having low grayscale value is to be thick. In addition, it is also considered that the rectangular interval wb of the white image Pw having a portion of a low grayscale value is to be broad. Further, it is also considered that the rectangular width ww of the white image Pw having a portion of (a high portion) a high grayscale value is to be decreased. It is preferable to determine in advance whether either of the rectangular width ww or the rectangular interval wb is first changed.

In addition, examples of FIG. 5A, FIG. 5B and FIG. 6A to 6G are examples and it is preferable that the rectangular width ww or the rectangular interval wb of the white image Pw of the adjustment image TP be changed to change the adjustment image TP such that the index value A exceeds the threshold value Yth according to various characteristics. More preferably, the threshold value Yth is set to be high such that the threshold value Yth is close to the grayscale value difference of the ideal grayscale pattern Yc, and the rectangular width ww or the rectangular interval wb of the white image Pw of the adjustment image TP is changed such that the grayscale pattern Ytp is close to the ideal grayscale pattern Yc. Therefore, in this manner, the adjustment image TP may be changed.

As described above, in the projector PJ of the present embodiment, when the focus adjustment is performed, a contrast value (a grayscale value difference) of the grayscale pattern of the captured adjustment image that is captured by projecting the adjustment image used in the focus adjustment becomes higher than the threshold value determined that the correction of the adjustment image is required and in this manner, the grayscale pattern of the adjustment image is corrected. In addition, using the adjustment image determined that the correction of the adjustment image is not required (no correction), the focus adjustment is performed. For this reason, the contrast value of the grayscale pattern of the captured adjustment image capturing the adjustment image used during the focus adjustment can be higher and thereby the accuracy of the focus adjustment can be improved. Therefore, depending on the influence of the projection state of the projector such as a state of the focus or a state of the zoom, the resolution of the imaging section, imaging characteristics of the imaging section, and the projection direction at starting point of the focus adjustment, it is possible to suppress the contrast value of the grayscale pattern of the captured adjustment image from being decreased. Therefore, it is possible to improve the accuracy of the focus adjustment. For example, even if the focus is largely deviated or the keystone correction is not performed, it is possible to accurately perform the focus adjustment using a high degree adjustment image of a degree suitable for the focus adjustment.

B. Second Embodiment

Figure 7:
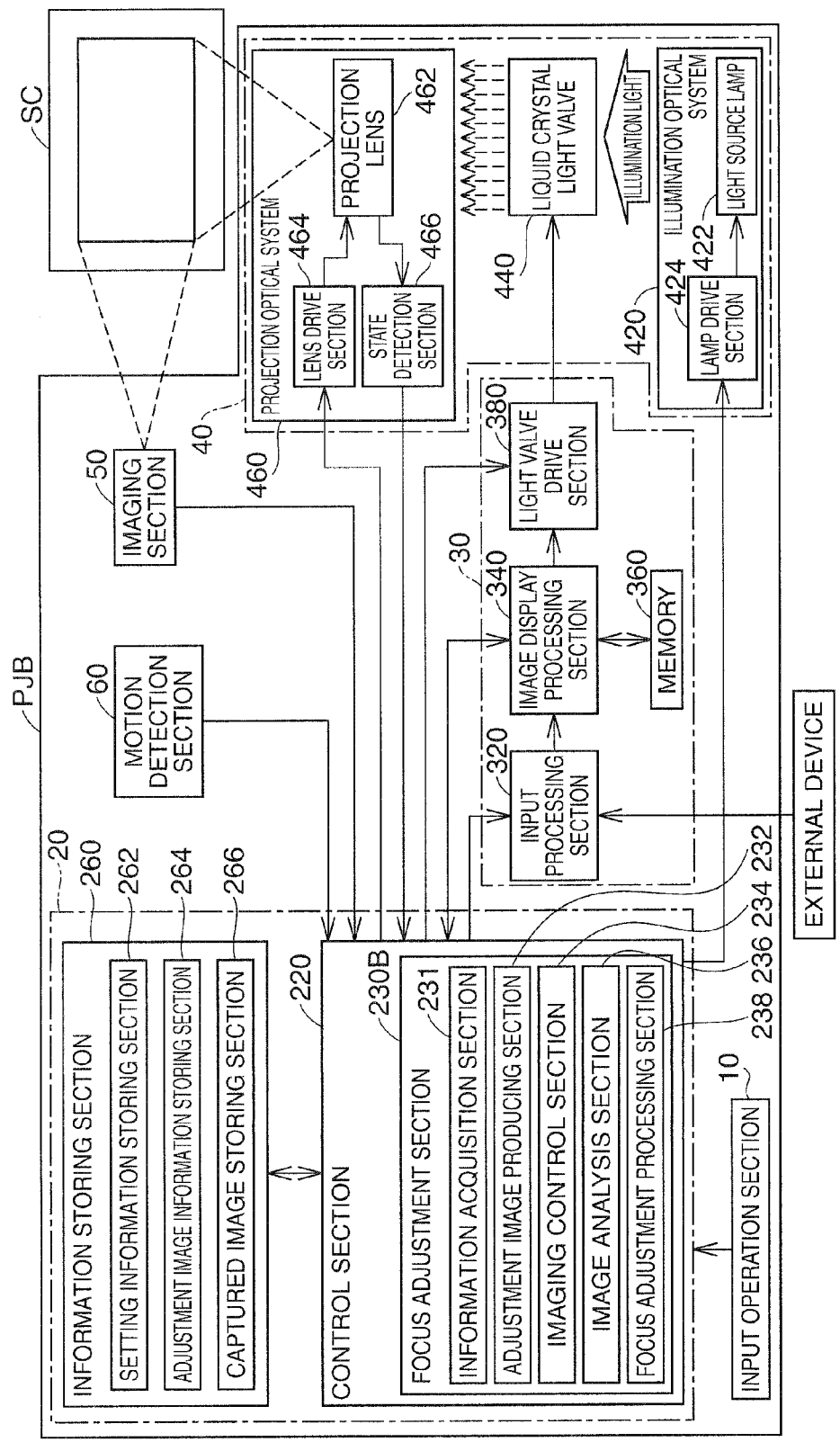
FIG. 7 is a block diagram schematically illustrating a configuration of a projector in a second embodiment.

FIG. 7 is a block diagram schematically illustrating a configuration of the projector in a second embodiment. A projector PJB in the embodiment is different in that the focus adjustment section 230 of the projector PJ (FIG. 1) in the first embodiment is replaced by a focus adjustment section 230B. Then, the focus adjustment section 230B is different in that an information acquisition section 231 is provided in addition to the adjustment image producing section 232 of the focus adjustment section 230, an imaging control section 234, the image analysis section 236 and the focus adjustment processing section 238. As described below, as the adjustment image production information for producing the adjustment image of the focus, the information acquisition section 231 is a function block of acquiring information (hereinafter, referred to as "projection condition information") with regard to the projection conditions of the projector at a starting point of the focus adjustment. In addition, the information acquisition section 231 and the image analysis section 234 may be provided in the adjustment image producing section 232. The other configuration of the projector PJB in the embodiment is similar to that of the projector PJ in the first embodiment. Therefore, the same configuration will have the same reference numerals and thus the description thereof will be omitted.

In addition, in the embodiment, the adjustment imaging producing section 232 and the image analysis section 236 are equivalent to the adjustment image producing section according to the invention and the imaging section 50 or the imaging section 50 and the imaging control section 234 are equivalent to the imaging section according to the invention.

Figure 8:
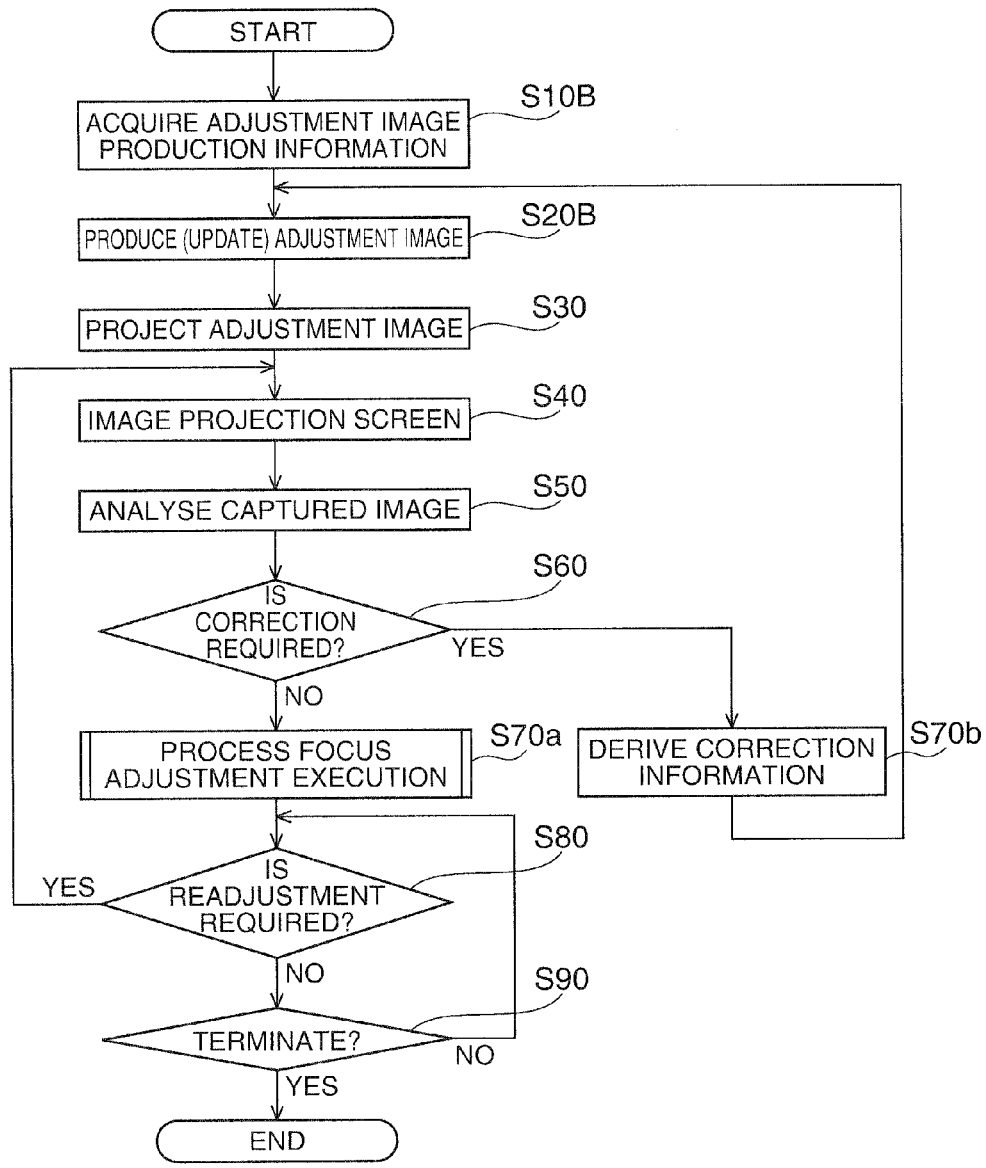
FIG. 8 is a flowchart illustrating a flow of a focus adjustment process in a second embodiment.

FIG. 8 is a flowchart illustrating the flow of the focus adjustment process in the embodiment. The flowchart is different in that only steps S10 and S20 of the flowchart (FIG. 2) of the focus adjustment process in the first embodiment are replaced by steps S10B and S20B and the other steps are the same. Therefore, the following herein describes the processes of step S10B and step S20B.

When the focus adjustment section 230B (FIG. 8) of a control section 220 starts the focus adjustment process, as described below, first in step S10B, the adjustment image producing information for producing the adjustment image of the focus is acquired by the information acquisition section 231 of the focus adjustment section 230B. Specifically, the image data of the distance measuring image pattern for measuring the projection distance is output to the image display processing section 340 of the image processing operation circuit 30 so as to project the image data on the screen SC. In addition, the projected distance measurement image pattern is captured by controlling the imaging section 50 using the imaging control section 234, and the information of the projection distance is acquired by analyzing the acquired captured image. In addition, a method of obtaining the projection distance can include a method of various general three-dimensional measurement methods using a triangular surveying method such as a method of projecting a spot image as a distance measurement image pattern, a method of projecting a line image and the like.

In addition, in step S10B, when the projection distance information is acquired, in step S20B, the adjustment image corresponding to the projection distance which is obtained as the adjustment image producing information is produced by the adjustment image producing section 232 and then the processes of each step are performed in the same manner as in the first embodiment. Herein, producing the adjustment image corresponding to the projection distance, for example, is performed as follows. That is, an adjustment image information storing section 264 stores in advance, the projection distance and the rectangular width ww and the rectangular interval wb of the white image Pw of the adjustment image TP (FIG. 3) which should be produced according to the projection distance in association with each other. Therefore, the adjustment image producing section 232 produces the adjustment image according to the projection distance with reference to the information stored in the adjustment image information storing section 264. In addition, in step S70b, the correction information is obtained and thus the process returns to step S20B, an update of the adjustment image performed in step S20B is similar to that of step S20 in the first embodiment.

As described above, in the projector of the embodiment, in a case of the focus adjustment, as the adjustment image producing information for producing the adjustment image of the focus, the projection distance information that is a piece of the projection condition information with regard to the projection condition of the projector at a starting point of the focus adjustment is acquired by measuring the projection distance, and according to the obtained projection distance information, the adjustment image which is initially displayed, is provided. Therefore, as described in the first embodiment, compared to a case where the adjustment image of a predetermined default is used, the grayscale pattern of an initially captured adjustment image is likely to be close to the grayscale pattern of the adjustment image, and there is a high possibility to determine that the adjustment image is not required to be corrected from the beginning. In addition, even if it is determined that the correction is required, there is an increased possibility to determine that the correction of the adjustment image is not required by the adjustment image that has been corrected. Therefore, it is possible to efficiently determine the adjustment image compared to the first embodiment.

C. Third Embodiment

Figure 9:
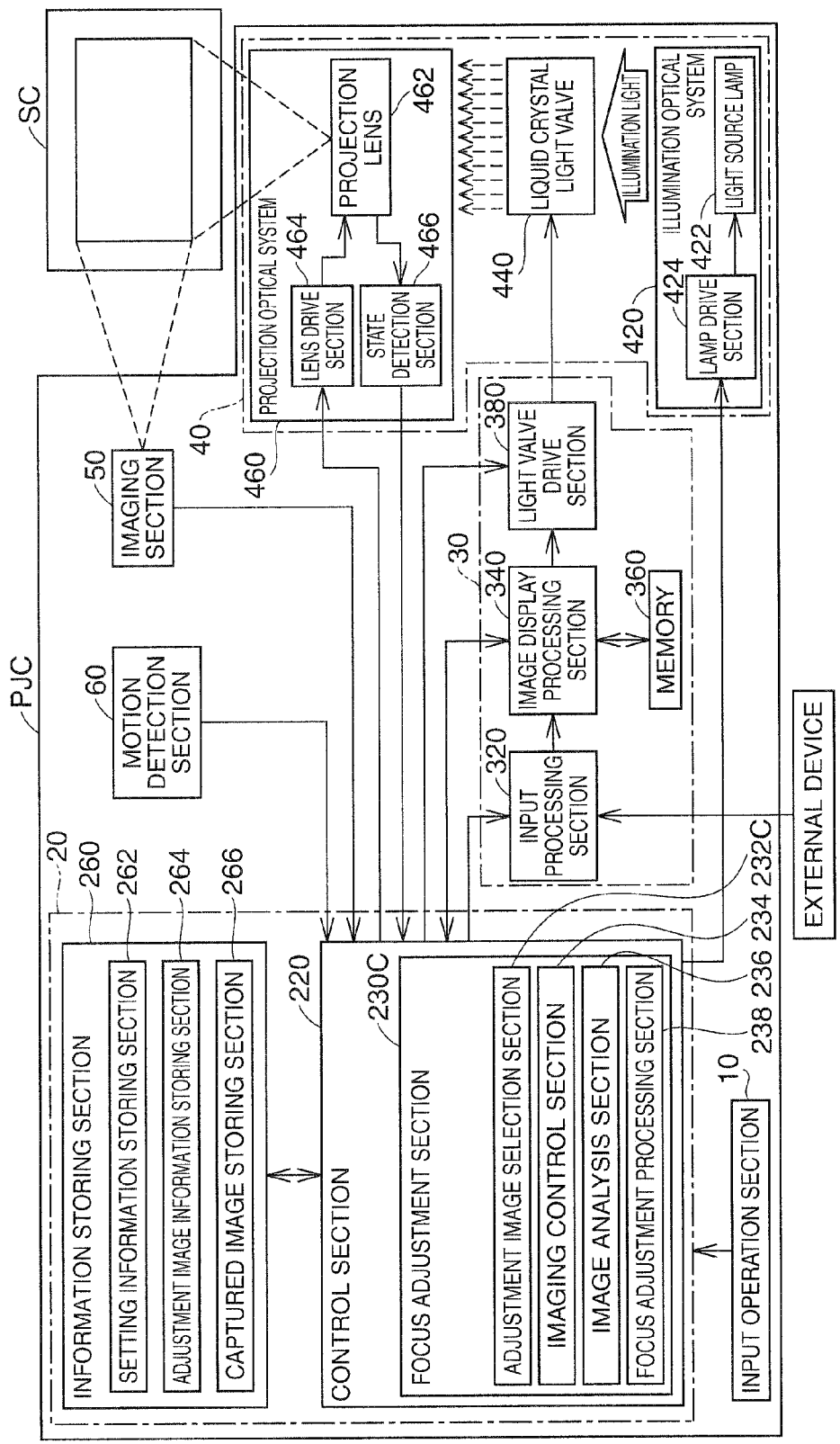
FIG. 9 is a block diagram schematically illustrating a configuration of a projector in a third embodiment.

FIG. 9 is a block diagram schematically illustrating a configuration of a projector in a third embodiment. A projector PJC in the embodiment is different in that the focus adjustment section 230 of the projector PJ (FIG. 1) in the first embodiment is replaced by a focus adjustment section 230C. In addition, the focus adjustment section 230C is different in that the adjustment image producing section 232 of the focus adjustment section 230 is replaced by an adjustment image selection section 232C. As described below, the adjustment image selection section 2320 is a block that selects the adjustment image and outputs the image data (the adjustment image data) of the selected adjustment image to the image display processing section 340 of the image processing operation circuit 30, as described below. In addition, the image analysis section 234 may be provided in the adjustment image selection section 232C. The other configuration of the projector PJC in the embodiment is similar to that of the projector PJ in the first embodiment. Therefore, the same configuration will have the same reference numerals and thus the description thereof will be omitted.

In addition, in the embodiment, the adjustment image selection section 232C and the image analysis section 236 are equivalent the adjustment image producing section according to the invention, and the imaging section 50 or the imaging section 50 and the imaging control section 234 are equivalent to the imaging section according to the invention.

Figure 10:
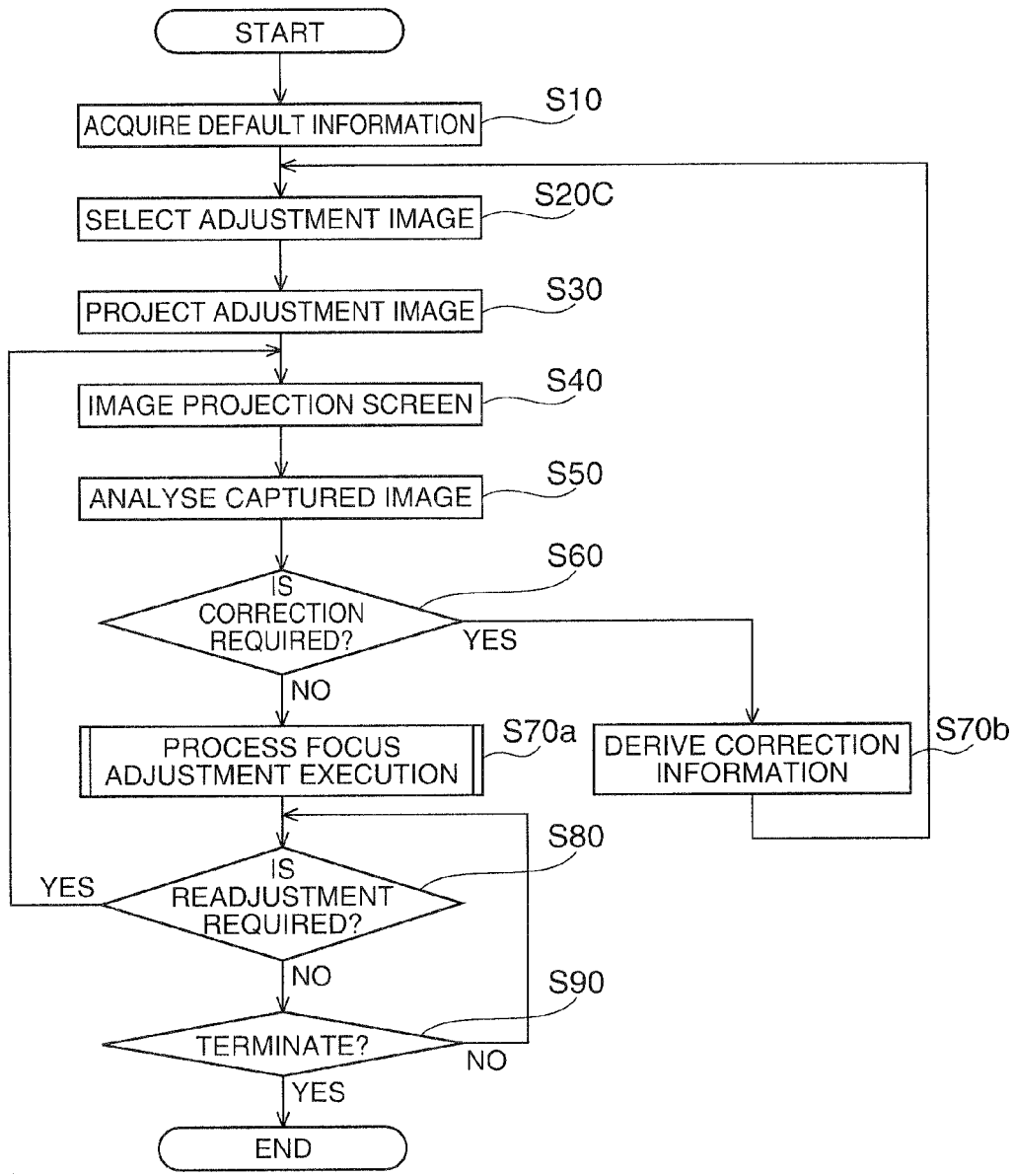
FIG. 10 is a flowchart illustrating a flow of a focus adjustment process in a third embodiment.

FIG. 10 is a flowchart illustrating the flow of the focus adjustment process in the third embodiment. The flowchart is different only in that step S20 of the flowchart (FIG. 2) of the focus adjustment process in the first embodiment is replaced by step 20C. The other step is the same. Therefore, herein the process of step S20C will be described below.

In step S10, when the default information of the adjustment image is acquired, in step S20C, the adjustment image according to the acquired default is selected by the adjustment image selection section 232 C (FIG. 9) of the focus adjustment section 230C, and the image data of the selected adjustment image is output to the image display processing section 340 of the image processing operation circuit 30 (FIG. 1). The adjustment image indicating the adjustment image data output to the image display processing section 340 is projected and displayed on the screen SC in step S30. In addition, when in step S70b, the correction information is obtained, and the process returns to step S20C, the adjustment image according to the correction information is selected and then the image data of the selected adjustment image is output to the image display processing section 340 of the image processing operation circuit 30.

Figure 11B:
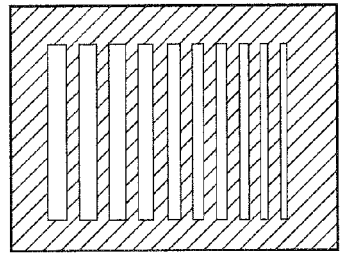
FIG. 11B is an explanatory view illustrating an example of a plurality of adjustment images prepared in advance.

Herein, a selection of the adjustment image according to the default information or the correction information is performed as follows. That is, the adjustment image information storing section 264 stores the image data (adjustment image data) of a plurality of previously prepared adjustment images, in a state where the rectangular width ww and the rectangular interval wb of the white image Pw of the respective adjustment images are associated with each other. FIGS. 11A and 11B are explanatory views illustrating an example of a plurality of previously prepared adjustment images.

For example, when the rectangular width ww and the rectangular interval wb are set to be medium as the default information, the adjustment image of (a) in FIG. 11A is selected.

Then, when the image analysis result as in FIG. 6A is obtained and the correction information such as "make the rectangular width ww thick" is obtained, for example, the adjustment image of (b2) in FIG. 11A where the rectangular width ww is caused to be thick from the state of (a) in FIG. 11A is selected. In addition, when the image analysis result as in FIGS. 6B, 6C and 6D is obtained and the correction information such as "make the rectangular width ww thin" is obtained, for example, the adjustment image of (b1) in FIG. 11A where the rectangular width ww is caused to be thin from the state of (a) in FIG. 11A is selected. When the image analysis result as in FIG. 6E is obtained and the correction result such as "make the rectangular interval wb narrow" is obtained, for example, the adjustment image of (c1) in FIG. 11A where the rectangular interval wb is caused to be narrow from the state of (a) in FIG. 11A is selected. In addition, when the image analysis result as in FIGS. 6F and 6G is obtained and the correction information such as "make the rectangular width of the decreased portion thick" or "make the rectangular interval of the decreased portion broad" is obtained, the information on "rising upward to the right" or falling downward to the right" is received as the correction information. Then, when information on "rising upward to the right" corresponding to FIG. 6F is obtained, for example, the adjustment image of (f) in FIG. 11B is selected and when information on "falling downward to the right" corresponding to FIG. 6G is obtained, the adjustment image of (g) in FIG. 11B is selected.

Figure 11B:
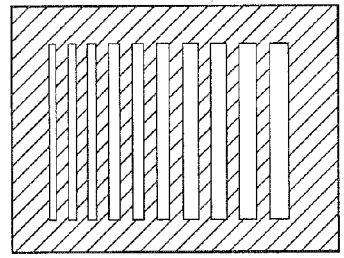

Similarly, when the correction information such as "make the rectangular interval wb broad" is obtained from the image analysis result, for example, the adjustment image of (c2) in FIG. 11A where the rectangular interval wb is caused to be broad from the state of (a) in FIG. 11A is selected. In addition, when the correction information such as "make rectangular interval wb narrow" is obtained at a state in which the adjustment image of (b1) in FIG. 11 is selected or when the correction information such as "make the rectangular width ww thin" is obtained in a state in which the adjustment image of (c1) in FIG. 11 is selected, the adjustment image of (d1) in FIG. 11 is selected. In addition, when the correction information such as "make rectangular interval wb broad" is obtained in a state in which the adjustment image of (b1) in FIG. 11 is selected, or when the correction information such as "make the rectangular width ww thin" is obtained in a state in which the adjustment image of (c2) in FIG. 11 is selected, the adjustment image of (d2) in FIG. 11 is selected. In addition, when the correction information such as "make the rectangular interval wb narrow" is obtained in a state which the adjustment image of (b2) in FIG. 11 is selected or when the correction information called "make the rectangular width ww thick" is obtained in a state which the adjustment image of (c1) in FIG. 11 is selected, the adjustment image of (e1) in FIG. 11 is selected. In addition, when the correction information called "make the rectangular interval wb broad" is obtained in a state in which the adjustment image of (b2) in FIG. 11 is selected or when the correction information called "make the rectangular width ww broad" is obtained at a state in which the adjustment image of (c1) in FIG. 11 is selected, the adjustment image of (e2) in FIG. 11 is selected.

As described above, the selection of the adjustment image according to the correction information is performed by selecting the adjustment image to be corrected according to the correction information based on the state of the adjustment image which is currently selected.

As described above, in the projector of the embodiment, a plurality of adjustment images are prepared in advance and the adjustment image according to the correction information obtained from the image analysis result of the captured adjustment image is selected. Therefore, the process in which the adjustment image according to the correction information is produced as in the first embodiment or the second embodiment can be omitted and thus it is possible to easily and efficiently determine the adjustment image for the focus adjustment.

In addition, even in the embodiment, similarly to the second embodiment, it is preferable to acquire the adjustment image producing information instead of the default information, and thus to select the adjustment image according to the acquired adjustment image producing information.

D. Modification Example

In addition, the invention is not limited to the above-mentioned embodiments and the invention can be embodied in various aspects without departing from the gist thereof.

Figure 12:
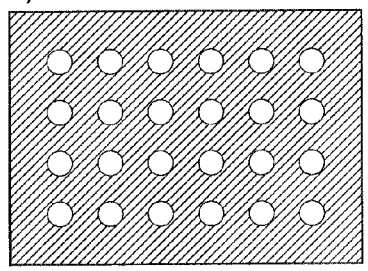
FIGS. 12A to 12D are explanatory views illustrating another example of several adjustment images.
Figure 12:
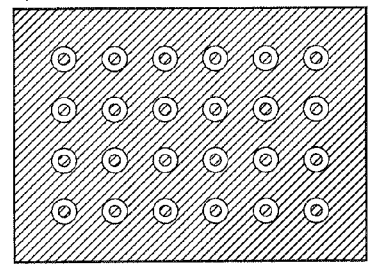
Figure 12:
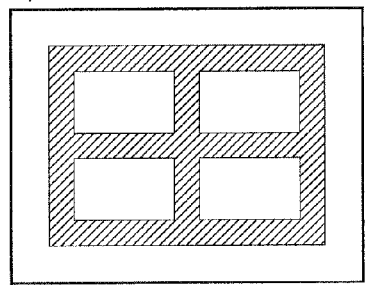
Figure 12:
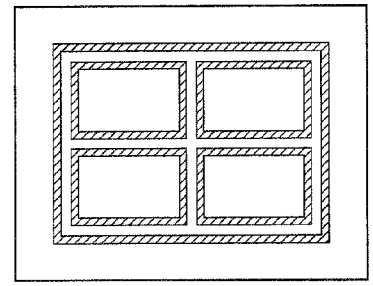

(1) In the above-mentioned embodiment, the adjustment image is described as an example of the stripe pattern image in which the white image and the black image are alternately arranged in the horizontal direction, but is not thereto. FIGS. 12A to 12D are explanatory views of the several other examples of the adjustment image. FIG. 12A is an example where white dots are arranged on a black background image (hatched area). The diameter of the dots and the interval of the dots are changed to adjust a grayscale values difference between the black and the white, and thus it is possible to provide the adjustment image which enables the focus adjustment to be more accurately performed. FIG. 12B is an example in which the white dots having an annular shape are arranged on the black background image (a hatched area). The outer diameter and the inner diameter of the dots or the interval of the dots are changed to adjust a grayscale value difference between the black and white, and thus it is possible to provide the adjustment image which enables the focus adjustment to be more accurately performed. FIG. 12C is an example in which lines having a black grid shape (a hatched area) are arranged on a white background image. The line width is changed to adjust the grayscale value difference between the white and the black. Therefore, it is possible to provide the adjustment image which enables the focus adjustment to be more accurately performed. FIG. 12D is an example where white lines having a grid shape are arranged in black lines having substantially grid shape of the black (a hatched area). A line width of the black and a line width of the white are changed to adjust the grayscale value difference between the white and the black, and thus it is possible to provide adjustment image which enables the focus adjustment to be more accurately performed. In FIGS. 12A to 12D, it is preferable to replace the white with the black and vice versa. The adjustment image described above is merely exemplified and if the adjustment image enables to adjust the grayscale value difference between the white and the black, it is possible to use various images as the adjustment image.

(2) In the above-described second embodiment, as the adjustment image producing information, the projection distance information that is a piece of the projection condition information with regard to the projection condition of the projector at the starting point of the focus adjustment is acquired through measuring the projection distance, and thus the initially displaying adjustment image is produced according to the acquired projection distance information. However, the projection condition information is not limited to the projection distance information and various conditions are considered, such as a zoom state, an ambient light state, the screen state (for example, color, material, inclination and the like). Each of conditions may be used along or in a plurality of combinations. The zoom state can be acquired by detecting the zoom positions of the zoom lens. In addition, the ambient light can be acquired by providing a device for measuring the state of the ambient light, such an illuminometer and the like. The color and the material can be acquired by setting of the user from the screen state. In addition, for example, the inclination can be acquired by using the method of the three-dimensional measurement method.

(3) In the above-described embodiment and modification example, in order to adjust the grayscale value difference between the white and the black, a case where the width, the interval and the diameter and the like are changed according to the correction information to change the type of the pattern of the adjustment image has been exemplified, but is not limited thereto and the shape of the pattern itself may be changed depending on the correction information. For example, the pattern of the adjustment image may be changed to various shapes such as the stripe pattern shape illustrated in FIG. 2, the doted pattern shape illustrated in FIG. 12A, the dot pattern shape having the annular shape illustrated in FIG. 123, the grid line shape illustrated in FIG. 12C, and the double grid shape line illustrated in FIG. 12D according to the correction information.

(4) In an embodiment described above, when the adjustment image is obliquely projected, for example, a case where the rectangular width and the rectangular interval of the white image of a portion having a decreased grayscale value of the adjustment image are changed, and the other portion is set to be the unchanged adjustment image has been described, as in the case where the grayscale pattern obtained from the analysis result is obliquely projected, when the grayscale pattern is changed by the position, the adjustment image may be limited to a portion and the rectangular width and the rectangular interval of the white image of the limited adjustment image may be changed. In this case, it is possible to produce the adjustment image which enables the focus adjustment with respect to at least a limited portion only. Therefore, it is possible to relatively efficiently produce the adjustment image for adjusting the focus in order to perform the focus adjustment compared to the case where the adjustment image is not limited. For example, in the case of the oblique projection described above, the adjustment image may be only limited to a portion having the low grayscale value and the rectangular width and the rectangular interval of the white image of the limited adjustment image may be changed. In addition, the adjustment image may be limited to only to a portion having a medium grayscale value or the adjustment image may be limited only to a portion having the increased grayscale value. In addition, it is preferable to limited only to portions of four corners of the adjustment image having a rectangular shape.

(5) In the above-described embodiment, the user operates the input operation section 10 to instruct the start of the focus adjustment, but without being limited thereto, it is possible to start the focus adjustment at various timings. For example, it is possible to automatically start the focus adjustment when driving the projector. In addition, the projector detects a state from a stopped state to a moving state, and thus may automatically start the focus adjustment. Further, in the above-described embodiment, the user operates and instructs the input operation section 10 to instruct the termination of the focus adjustment, and thus terminates the focus adjustment, but without being limited thereto, it is possible to terminate the focus adjustment at the various timings. For example, after the focus adjustment is performed, the focus adjustment may be automatically terminated by keeping a constant period of timing. Furthermore, the focus adjustment is performed and then may be terminated when a stopped state of the projector is continuous during the constant period of time.

(6) In the above-described embodiment, the projectors PJ, PJB, and PJC adopt a liquid crystal light valve 440 that uses a transmission liquid crystal panel to convert light from the illumination optical system 420 into image light, but may adopt a DMD (digital micro-mirror device) and a reflective liquid crystal panel and the like.

What is claimed is:

1. An image processing apparatus for use in a projector which projects and displays an image on a projection surface, the image processing apparatus comprising:

an adjustment image producing section that produces an adjustment image from adjustment image data for adjusting a focus of a projected image to be displayed on the projection surface; and an imaging section that images the adjustment image projected on the projection surface and outputs an image signal according to a captured adjustment image, wherein the adjustment image producing section changes the adjustment image data to be produced, such that a grayscale pattern of the captured adjustment image obtained by imaging is close to a grayscale pattern of the adjustment image.

2. The image processing apparatus according to claim 1, wherein the adjustment image is an image of the grayscale pattern having repeated brightness and darkness, and wherein the adjustment image producing section changes the adjustment image data to be produced by changing either a width of a bright image portion corresponding to the brightness of the adjustment image or an interval interposed between the bright image portions, according to a relationship between the grayscale pattern of the adjustment image and the grayscale pattern of the captured adjustment image, when the adjustment image to be produced is changed.

3. The image processing apparatus according to claim 1, further comprising:

an adjustment image information storing section that stores a plurality of the adjustment images having different grayscale patterns in advance, wherein the adjustment image producing section changes the adjustment image data to be produced by selecting one from the plurality of adjustment images.

4. The image processing apparatus according to claim 1, wherein the adjustment image producing section produces an initial adjustment image according to a projecting condition information relating to a projecting condition including at least a projecting distance of the projector when starting the focus adjustment.

5. A projector which projects and displays an image on a projection surface, comprising:

the image processing apparatus according to claim 1, and a projecting section that projects the image.

6. A projector which projects and displays an image on a projection surface, comprising:

the image processing apparatus according to claim 2, and a projecting section that projects the image.

7. A projector which projects and displays an image on a projection surface, comprising:

the image processing apparatus according to claim 3, and a projecting section that projects the image.

8. A projector which projects and displays an image on a projection surface, comprising:

the image processing apparatus according to claim 4, and a projecting section that projects the image.

9. The image processing apparatus according to claim 1, wherein the imaging section includes a CCD camera that converts the captured adjustment image to the image signal.

10. An image processing apparatus for use in a projector which projects and displays an image on a projection surface, the image processing apparatus comprising:

an adjustment image producing section that produces an adjustment image from adjustment image data for adjusting a focus of a projected image to be displayed on the projection surface; and an imaging section that images the adjustment image projected on the projection surface and outputs an image signal according to a captured adjustment image, wherein the adjustment image producing section obtains an index value that indicates a degree of suitability for a focus adjustment from a difference in grayscale variation of a grayscale pattern of the captured adjustment image obtained by imaging, and changes the adjustment image data to be produced such that the index value exceeds a threshold value when the obtained index value is equal to or less than a predetermined threshold value.

11. A projector which projects and displays an image on a projection surface, comprising:

the image processing apparatus according to claim 10, and a projecting section that projects the image.

12. The image processing apparatus according to claim 10, wherein the imaging section includes a CCD camera that converts the captured adjustment image to the image signal.

13. A control method of a projector which projects and displays an image on a projection surface, the method comprising:

(a) producing an adjustment image from adjustment image data for adjusting a focus of a projected image to be displayed on the projection surface;

(b) projecting the adjustment image on the projection surface; and (c) imaging the adjustment image projected on the projection surface and outputting an image signal according to a captured adjustment image, wherein the producing of an adjustment image (a) includes changing the adjustment image data to be produced, such that a grayscale pattern of the captured adjustment image is close to a grayscale pattern of the adjustment image.

14. A control method of a projector which projects and displays an image on a projection surface, the method comprising:

(a) producing an adjustment image from adjustment image data for adjusting a focus of a projected image to be displayed on the projection surface;

(b) projecting the adjustment image on the projection surface; and (c) imaging the adjustment image projected on the projection surface and outputting an image signal according to a captured adjustment image, wherein the producing of an adjustment image (a) includes changing the adjustment image data to be produced by obtaining an index value that indicates a degree of a suitability for a focus adjustment from a difference in grayscale variation of a grayscale pattern of the captured adjustment image obtained by imaging such that the index value exceeds a threshold value when the obtained value is equal to or less than a predetermined threshold value.

* * * * *